US012716771B2

(12) United States Patent
Liang et al.

(10) Patent No.: US 12,716,771 B2
(45) Date of Patent: Aug. 25, 2026

(54) FLUORESCENT ANTENNA, OPTICAL RECEIVER, AND SIGNAL PROCESSING METHOD

(71) Applicant: HUAWEI TECHNOLOGIES CO., LTD., Shenzhen (CN)

(72) Inventors: Dong Liang, Shenzhen (CN); Jingjing Huang, Shenzhen (CN); Junping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 18/527,478

(22) Filed: Dec. 4, 2023

(65) Prior Publication Data

US 2024/0094051 A1 Mar. 21, 2024

Related U.S. Application Data

(63) Continuation of application No. PCT/CN2022/096964, filed on Jun. 2, 2022.

(30) Foreign Application Priority Data

Jun. 4, 2021 (CN) ......................... 202110626671.9

(51) Int. Cl.

| | |
|---|---|
| ***G01J 1/42*** | (2006.01) |
| ***G01J 1/04*** | (2006.01) |
| ***H04B 10/69*** | (2013.01) |

(52) U.S. Cl.

CPC ............... *G01J 1/42* (2013.01); *G01J 1/0422* (2013.01); *H04B 10/691* (2013.01)

(58) Field of Classification Search

CPC .......... G01J 1/42; G01J 1/0422; H04B 10/691
See application file for complete search history.

(56) References Cited

U.S. PATENT DOCUMENTS

| | | | |
|---|---|---|---|
| 2015/0124433 | A1 | 5/2015 | Onishi et al. |
| 2020/0335882 | A1 | 10/2020 | Zhang et al. |

FOREIGN PATENT DOCUMENTS

| | | |
|---|---|---|
| CN | 105025280 A | 11/2015 |
| CN | 109781250 B | 4/2020 |

OTHER PUBLICATIONS

Peyronel, T., et al. "Luminescent detector for free-space optical communication." Optica 3.7 (2016): 787-792. (Year: 2016).*

(Continued)

*Primary Examiner* — Uzma Alam
*Assistant Examiner* — Richard O Toohey
(74) *Attorney, Agent, or Firm* — HAUPTMAN HAM, LLP

(57) ABSTRACT

The fluorescent antenna includes at least one layer of fluorescent array, the fluorescent array includes a plurality of fluorescent units, and an isolation layer used to isolate emergent optical signals converted by adjacent fluorescent units is included between adjacent fluorescent units. The fluorescent units include at least one fluorescent region; and when the fluorescent antenna includes one layer of fluorescent array, the fluorescent units are all fluorescent regions; or when the fluorescent antenna includes at least two layers of fluorescent arrays, the fluorescent unit further includes at least one transparent region. In two adjacent layers of fluorescent arrays, a transparent region of the first layer overlaps a fluorescent region of the second layer, and an incident optical signal arrives at the fluorescent region of the second layer through the transparent region of the first layer.

20 Claims, 13 Drawing Sheets

(56) References Cited

OTHER PUBLICATIONS

Manousiadis, Pavlos P., et al. "Optical antennas for wavelength division multiplexing in visible light communications beyond the étendue limit." Advanced Optical Materials 8.4 (2020): 1901139. (Year: 2020).*

He, Cuiwei, et al. "Wavelength division multiplexing in visible light communications using fluorescent fiber antennas." Journal of Lightwave Technology 42.10 (2024): 3725-3735. (Year: 2024).*

Extended European Search Report issued in corresponding European Application No. 22815369.8, dated Sep. 27, 2024, pp. 1-11.

Rahmat Mulyawan et al. MIMO Visible Light Communications Using a Wide Field-of-View Fluorescent Concentrator, Jan. 9, 2017, total 4 pages.

Tao Dong et al. Plasmonic Nanoantenna Array Design, Jan. 4, 2020, total 19 pages.

Korean Office Action issued in corresponding Korean Patent Application No. 2023-7045032, mailed on Dec. 17, 2025, pp. 1-11.

* cited by examiner

FLUORESCENT ANTENNA, OPTICAL RECEIVER, AND SIGNAL PROCESSING METHOD

CROSS-REFERENCE TO RELATED APPLICATIONS

This application is a continuation of International Application No. PCT/CN2022/096964, filed on Jun. 2, 2022, which claims priority to Chinese Patent Application No. 202110626671.9, filed on Jun. 4, 2021. The disclosures of the aforementioned applications are hereby incorporated by reference in their entireties.

TECHNICAL FIELD

This application relates to the field of optical wireless communication technologies, and in particular, to a fluorescent antenna, an optical receiver, and a signal processing method.

BACKGROUND

In an existing optical wireless communication (optical wireless communication, OWC) system, an optical receiver may distinguish different optical signals through space division multiplexing based on different spatial domain resources, to increase a communication rate.

Currently, as shown in FIG. 1, an optical receiver may include a lens, a photodetector array, a trans-impedance amplifier array, an analog-to-digital converter, and the like. After optical signals sent by different users pass through the lens, the optical signals may be converged to form different light spots and the light spots are projected to the photodetector array. The photodetector performs photoelectric conversion, and transmits an electrical signal obtained after the photoelectric conversion to the trans-impedance amplifier array and the analog-to-digital converter for signal processing. However, the optical receiver needs a large-scale photodetector array. If an image sensor is used as the photodetector, a bandwidth of the image sensor is limited, and a requirement on high-speed communication cannot be met. If a photodiode with a larger bandwidth is used as the photodetector, a structure of integration in a package or on a board needs to be used to form the photodetector array, and implementation complexity is higher. A cabling spacing needs to be considered between the photodetectors, and there is a gap, causing a blind spot of the optical receiver.

As shown in FIG. 2, a photodetector array may be replaced with a fluorescent concentrator and photodetectors on both sides of the fluorescent concentrator. After optical signals sent by different users pass through a lens, the optical signals may be converged to form different light spots and the light spots are projected to the fluorescent concentrator. The fluorescent concentrator generates an emergent optical signal, and transmits the emergent optical signal to the photodetectors, to avoid using a large-scale photodetector array.

When there are a plurality of optical signals, a plurality of emergent optical signals are generated in the fluorescent concentrator by using a plurality of light spots formed by the plurality of optical signals. The plurality of emergent optical signals may be omnidirectionally transmitted in the fluorescent concentrator. To be specific, each photodetector receives the plurality of emergent optical signals, and there is interference between the plurality of emergent optical signals. The interference may be reduced by reducing a quantity of optical signals. However, a quantity of optical signals supported by an optical receiver is also reduced. Consequently, a space division multiplexing capability of the optical receiver is limited, a communication rate cannot be increased, and larger-scale multiple-input multiple-output (multiple-input multiple-output, MIMO) and uplink multi-user access cannot be supported.

SUMMARY

In view of this, embodiments of this application provide a fluorescent antenna, an optical receiver, and a signal processing method, to increase a quantity of optical signals supported by the optical receiver, enhance a spatial multiplexing capability, increase a communication rate, and support larger-scale multiple-input multiple-output and uplink multi-user access.

According to a first aspect, an embodiment of this application provides a fluorescent antenna. The fluorescent antenna includes one or more layers of fluorescent arrays, the fluorescent array includes a plurality of fluorescent units, an isolation layer is included between adjacent fluorescent units, the fluorescent unit includes one or more fluorescent regions, and the isolation layer is used to isolate emergent optical signals converted by the adjacent fluorescent units; and when the fluorescent antenna includes one layer of fluorescent array, the fluorescent units are all fluorescent regions; or when the fluorescent antenna includes at least two layers of the fluorescent arrays, the fluorescent unit further includes one or more transparent regions; in two adjacent layers of fluorescent arrays, the transparent region of a first layer of fluorescent array overlaps the fluorescent region of a second layer of fluorescent array; and an incident light signal arrives at the fluorescent region of the second layer of fluorescent array through the transparent region of the first layer of fluorescent array.

According to the first aspect, the isolation layer is disposed between the adjacent fluorescent units of the fluorescent antenna, so that emergent optical signals leaked from a current fluorescent unit to another fluorescent unit can be reduced. This reduces interference between the emergent optical signals, increases a quantity of optical signals supported by the optical receiver, enhances a spatial multiplexing capability, increases a communication rate, and effectively supports larger-scale MIMO and uplink multi-user access.

In a possible design, the isolation layer includes one or more of the following: a high reflection layer, a first filter layer, and a dielectric layer, where a refractive index of the dielectric layer is less than a refractive index of the fluorescent unit.

According to the possible design, the isolation layer may be a material such as the high reflection layer, the first filter layer, or the dielectric layer that can be used to isolate emergent optical signals converted by the adjacent fluorescent units, to provide a flexible solution for isolating the emergent optical signals converted by the adjacent fluorescent units.

In a possible design, in the fluorescent unit, the transparent region and the fluorescent region are alternately arranged.

According to the possible design, in the fluorescent unit, the transparent region and the fluorescent region may be alternately arranged, or may not be alternately arranged, to provide a flexible solution for arranging the transparent region and the fluorescent region.

In a possible design, when the fluorescent antenna includes at least two layers of fluorescent arrays, a second filter layer is included between two adjacent layers of fluorescent arrays, where the second filter layer is used to isolate the emergent optical signals between the adjacent fluorescent arrays.

According to the possible design, the filter layer may also be included between the two adjacent layers of fluorescent arrays, to reduce emergent optical signals that enter an adjacent fluorescent array of the current fluorescent array, and reduce interference caused to an emergent optical signal of the adjacent fluorescent array of the current fluorescent array.

In a possible design, an entire region of each fluorescent region of the fluorescent unit is filled with a fluorescent material; and when all fluorescent regions of the fluorescent unit are filled with the same fluorescent material, the fluorescent unit is connected to one photodetector; or when at least two fluorescent regions of the fluorescent unit are filled with different fluorescent materials, the fluorescent unit is connected to at least two photodetectors.

According to the possible design, all fluorescent regions of the fluorescent unit may be filled with fluorescent materials, and the fluorescent materials filled in the fluorescent regions of the fluorescent unit may be the same or different. When the at least two fluorescent regions of the fluorescent unit are filled with different fluorescent materials, the fluorescent unit may be connected to the at least two photodetectors, so that emergent optical signals converted by the fluorescent regions filled with different fluorescent materials may correspond to different photodetectors. This increases the quantity of optical signals supported by the fluorescent antenna and enhances the space division multiplexing capability.

In a possible design, a partial region of each fluorescent region of the fluorescent unit is filled with a fluorescent material, different fluorescent regions are filled with different fluorescent materials, and the fluorescent unit is connected to a plurality of photodetectors.

According to the possible design, each fluorescent region of the fluorescent unit may be partially filled with the fluorescent material, and different fluorescent regions are filled with different fluorescent materials, so that the fluorescent unit maps, based on a spatial layer in which the fluorescent material is located, emergent optical signals converted by fluorescent regions with the partial region filled with the fluorescent material to different photodetectors. This increases the quantity of optical signals supported by the fluorescent antenna, and enhances the spatial multiplexing capability.

In a possible design, each fluorescent region of the fluorescent unit is filled with one or more fluorescent materials.

According to the possible design, each fluorescent region of the fluorescent unit may be filled with one or more fluorescent materials.

In a possible design, when the fluorescent unit includes at least two fluorescent materials, a wavelength of an emergent optical signal converted by a first fluorescent region is greater than a wavelength of an emergent optical signal converted by a second fluorescent region; a fluorescent material filled in the first fluorescent region is different from a fluorescent material filled in the second fluorescent region; a distance between the first fluorescent region and a photodetector is greater than a distance between the second fluorescent region and the photodetector; and the photodetector is a photodetector connected to the fluorescent unit.

According to the possible design, when the fluorescent unit includes at least two fluorescent materials, the wavelength of the emergent optical signal corresponding to the fluorescent material may increase in a direction away from the photodetector connected to the fluorescent unit, to reduce emergent optical signals absorbed by the fluorescent material in a process of transmitting the emergent optical signals to the photodetector, and ensure energy of the emergent optical signals.

In a possible design, in the fluorescent unit, the wavelength of the emergent optical signal converted by the first fluorescent region is greater than an absorption spectrum of the fluorescent material filled in the second fluorescent region.

According to the possible design, in the fluorescent unit, the wavelength of the emergent optical signal corresponding to the fluorescent material used in the fluorescent region far away from the photodetector may be greater than the absorption spectrum of the fluorescent material used in the fluorescent region close to the photodetector, so that emergent optical signals absorbed by the fluorescent material in a process of transmitting the emergent optical signals to the photodetector can be reduced, to ensure energy of the emergent optical signals.

According to a second aspect, an embodiment of this application provides an optical receiver, including a lens, a fluorescent antenna, and a photodetector array. The lens is configured to receive an incident optical signal, and the incident optical signal that passes through the lens is converged on the fluorescent antenna to form a light spot. The fluorescent antenna includes one or more layers of fluorescent arrays, the fluorescent array includes a plurality of fluorescent units, an isolation layer is included between adjacent fluorescent units, the fluorescent unit includes one or more fluorescent regions, and the isolation layer is used to isolate emergent optical signals converted by the adjacent fluorescent units; and when the fluorescent antenna includes one layer of fluorescent array, the fluorescent units are all fluorescent regions; or when the fluorescent antenna includes at least two layers of fluorescent arrays, the fluorescent unit further includes one or more transparent regions; in two adjacent layers of fluorescent arrays, the transparent region of a first layer of fluorescent array overlaps the fluorescent region of a second layer of fluorescent array; and an incident light signal arrives at the fluorescent region of the second layer of fluorescent array through the transparent region of the first layer of fluorescent array. The photodetector array includes a plurality of photodetectors, and each fluorescent unit is connected to one or more of the photodetectors.

According to the second aspect, the fluorescent antenna is disposed in the receiver, so that emergent optical signals leaked from a current fluorescent unit to another fluorescent unit can be reduced. This reduces interference between the emergent optical signals, increases a quantity of optical signals supported by the optical receiver, enhances a spatial multiplexing capability, increases a communication rate, and effectively supports larger-scale MIMO and uplink multi-user access. In addition, when a size and complexity of the optical receiver are limited, if multi-user access is implemented in terms of wavelength, implementation complexity and costs of a terminal device are higher, and there are wavelength scheduling overheads in a multi-user access process. However, the foregoing problem can be overcome by implementing uplink multi-user access in terms of space. In addition, a fluorescent antenna based on a fluorescent effect is insensitive to an incident direction of an optical signal, that is, performance of receiving an incident optical signal at different angles is the same, so that communication link stability can be ensured in a multi-user moving scenario.

In a possible design, the isolation layer includes one or more of the following: a high reflection layer, a first filter layer, and a dielectric layer, where a refractive index of the dielectric layer is less than a refractive index of the fluorescent unit.

According to the possible design, the isolation layer may be a material such as the high reflection layer, the first filter layer, or the dielectric layer that can be used to isolate emergent optical signals converted by the adjacent fluorescent units, to provide a flexible solution for isolating the emergent optical signals converted by the adjacent fluorescent units.

In a possible design, in the fluorescent unit, the transparent region and the fluorescent region are alternately arranged.

According to the possible design, in the fluorescent unit, the transparent region and the fluorescent region may be alternately arranged, or may not be alternately arranged, to provide a flexible solution for arranging the transparent region and the fluorescent region.

In a possible design, when the fluorescent antenna includes at least two layers of fluorescent arrays, a second filter layer is included between two adjacent layers of fluorescent arrays, where the second filter layer is used to isolate the emergent optical signals between the adjacent fluorescent arrays.

According to the possible design, the filter layer may also be included between the two adjacent layers of fluorescent arrays, to reduce emergent optical signals that enter an adjacent fluorescent array of a current fluorescent array, and reduce interference caused to an emergent optical signal of the adjacent fluorescent array of the current fluorescent array.

In a possible design, an entire region of each fluorescent region of the fluorescent unit is filled with a fluorescent material; and when all fluorescent regions of the fluorescent unit are filled with the same fluorescent material, the fluorescent unit is connected to one photodetector; or when at least two fluorescent regions of the fluorescent unit are filled with different fluorescent materials, the fluorescent unit is connected to at least two photodetectors.

According to the possible design, all fluorescent regions of the fluorescent unit may be filled with fluorescent materials, and the fluorescent materials filled in the fluorescent regions of the fluorescent unit may be the same or different. When the at least two fluorescent regions of the fluorescent unit are filled with different fluorescent materials, the fluorescent unit may be connected to the at least two photodetectors, so that emergent optical signals converted by the fluorescent regions filled with different fluorescent materials may correspond to different photodetectors. This increases the quantity of optical signals supported by the fluorescent antenna, and enhances the space division multiplexing capability.

In a possible design, a partial region of each fluorescent region of the fluorescent unit is filled with a fluorescent material, different fluorescent regions are filled with different fluorescent materials, and the fluorescent unit is connected to a plurality of photodetectors.

According to the possible design, each fluorescent region of the fluorescent unit may be partially filled with the fluorescent material, and different fluorescent regions are filled with different fluorescent materials, so that the fluorescent unit maps, based on a spatial layer in which the fluorescent material is located, emergent optical signals converted by fluorescent regions with the partial region filled with the fluorescent material to different photodetectors. This increases the quantity of optical signals supported by the fluorescent antenna, and enhances the spatial multiplexing capability.

In a possible design, each fluorescent region of the fluorescent unit is filled with one or more fluorescent materials.

According to the possible design, each fluorescent region of the fluorescent unit may be filled with one or more fluorescent materials.

In a possible design, when the fluorescent unit includes at least two fluorescent materials, a wavelength of an emergent optical signal converted by a first fluorescent region is greater than a wavelength of an emergent optical signal converted by a second fluorescent region; a fluorescent material filled in the first fluorescent region is different from a fluorescent material filled in the second fluorescent region; a distance between the first fluorescent region and a photodetector is greater than a distance between the second fluorescent region and the photodetector; and the photodetector is a photodetector connected to the fluorescent unit.

According to the possible design, when the fluorescent unit includes at least two fluorescent materials, the wavelength of the emergent optical signal corresponding to the fluorescent material may increase in a direction away from the photodetector connected to the fluorescent unit, to reduce emergent optical signals absorbed by the fluorescent material in a process of transmitting the emergent optical signals to the photodetector, and ensure energy of the emergent optical signals.

In a possible design, in the fluorescent unit, the wavelength of the emergent optical signal converted by the first fluorescent region is greater than an absorption spectrum of the fluorescent material filled in the second fluorescent region.

According to the possible design, in the fluorescent unit, the wavelength of the emergent optical signal corresponding to the fluorescent material used in the fluorescent region far away from the photodetector may be greater than the absorption spectrum of the fluorescent material used in the fluorescent region close to the photodetector, so that emergent optical signals absorbed by the fluorescent material in a process of transmitting the emergent optical signals to the photodetector can be reduced, to ensure energy of the emergent optical signals.

In a possible design, when the fluorescent unit includes at least two fluorescent materials, the fluorescent unit corresponds to emergent optical signals of at least two wavelengths.

In a possible design, the fluorescent unit is connected to at least two photodetectors, and the photodetector includes a third filter layer, where the third filter layer is used to allow one of the emergent optical signals of at least two wavelengths to pass through.

According to the foregoing two possible designs, when the fluorescent unit includes at least two fluorescent materials, the fluorescent unit may correspond to the emergent optical signals of at least two wavelengths. In this case, the fluorescent unit may be connected to the plurality of photodetectors, different photodetectors may process emergent optical signals of different wavelengths, and each photodetector may allow, by using the third filter layer of the photodetector, an emergent optical signal of a wavelength corresponding to the photodetector to pass through and process the emergent optical signal. In this way, the optical receiver can process emergent optical signals of different wavelengths, the quantity of optical signals supported by the optical receiver is increased, and the optical signal processing capability of the optical receiver is enhanced.

In a possible design, the optical receiver further includes an optical concentrator, and the fluorescent unit is connected, by using the optical concentrator, to a photodetector corresponding to the fluorescent unit.

According to the possible design, the optical receiver may further converge the emergent optical signal by using the optical concentrator, to ensure energy of the emergent optical signal.

In a possible design, when the fluorescent unit is connected to at least two photodetectors, the optical receiver further includes a grating, where the fluorescent unit is connected, by using the grating, to the at least two photodetectors corresponding to the fluorescent unit.

According to the possible design, the optical receiver may further transmit, by using the grating, emergent optical signals of different wavelengths to different optoelectronic detectors, to enhance the space division multiplexing capability of the optical receiver, and increase a quantity of supported users.

In a possible design, the optical receiver further includes an adjustment unit, where the adjustment unit is configured to adjust a position of a light spot that is on the fluorescent antenna and that corresponds to the incident optical signal.

According to the possible design, the optical receiver may further adjust, by using the adjustment unit, the position of the light spot on the fluorescent antenna, to narrow an overlapping region between a plurality of light spots, and avoid a multi-user conflict.

In a possible design, the optical receiver further includes a transceiver unit and a signal processing unit. The transceiver unit is connected to each of the photodetectors in the photodetector array and the adjustment unit, and the signal processing unit is connected to the transceiver unit. The transceiver unit is configured to receive an electrical signal sent by the photodetector; the signal processing unit is configured to process the electrical signal to obtain a processing result; and the transceiver unit is further configured to send the processing result to the adjustment unit. The adjustment unit is further configured to adjust the position of the light spot on the fluorescent antenna based on the processing result.

According to the possible design, the adjustment unit in the optical receiver may adjust the position of the light spot on the fluorescent antenna based on the processing result of the signal processing unit, to narrow an overlapping region between a plurality of light spots, and avoid a multi-user conflict.

According to a third aspect, an embodiment of this application provides a signal processing method. The method is applied to an optical receiver. The method may include: receiving, by the optical receiver, an incident optical signal, and converging, by using a lens, the incident optical signal on a fluorescent antenna to form a light spot; converting, by the optical receiver, the light spot into an emergent optical signal by using a fluorescent unit of the fluorescent antenna, and transmitting the emergent optical signal to a photodetector connected to the fluorescent unit; and converting, by the optical receiver, the emergent optical signal into an electrical signal by using the photodetector. The fluorescent antenna includes one or more layers of fluorescent arrays, the fluorescent array includes a plurality of fluorescent units, an isolation layer is included between adjacent fluorescent units, the fluorescent unit includes one or more fluorescent regions, and the isolation layer is used to isolate emergent optical signals converted by the adjacent fluorescent units; and when the fluorescent antenna includes one layer of fluorescent array, the fluorescent units are all fluorescent regions; or when the fluorescent antenna includes at least two layers of the fluorescent arrays, the fluorescent unit further includes one or more transparent regions; in two adjacent layers of fluorescent arrays, the transparent region of a first layer of fluorescent array overlaps the fluorescent region of a second layer of fluorescent array; and an incident light signal arrives at the fluorescent region of the second layer of fluorescent array through the transparent region of the first layer of fluorescent array.

According to the third aspect, when the optical receiver processes the incident optical signal, emergent optical signals leaked from a current fluorescent unit to another fluorescent unit can be reduced by using the isolation layer between the adjacent fluorescent units of the fluorescent antenna. This reduces interference between the emergent optical signals, increases a quantity of optical signals supported by the optical receiver, enhances a spatial multiplexing capability, increases a communication rate, and effectively supports larger-scale MIMO and uplink multi-user access.

In a possible design, the optical receiver converts, by using a signal processing unit, the electrical signal into a digital signal, and determines, based on the digital signal, one or more fluorescent units corresponding to the incident optical signal.

According to the possible design, the optical receiver converts the electrical signal into the digital signal, and processes the digital signal, to reduce processing complexity and improve signal processing efficiency.

In a possible design, the optical receiver determines, by using the signal processing unit, fluorescent units corresponding to the same digital signal as fluorescent units corresponding to the same incident optical signal.

According to the possible design, when the light spot corresponding to the incident optical signal occupies a plurality of fluorescent units, emergent optical signals converted by the plurality of fluorescent units are the same, and the emergent optical signals correspond to the same electrical signal and the same digital signal. The signal processing unit may determine, by comparing the digital signals, the fluorescent units with the same digital signal as the fluorescent regions corresponding to the same incident optical signal.

In a possible design, the optical receiver determines, by using the signal processing unit based on one or more of the following parameters of the digital signal corresponding to each fluorescent unit: a waveform, a signal-to-noise ratio, and a signal to interference plus noise ratio, whether there is a multi-user conflict in each fluorescent unit, where the multi-user conflict is that a plurality of incident optical signals correspond to one digital signal.

In a possible design, when there is the multi-user conflict in the fluorescent unit in the optical receiver, the optical receiver adjusts, by using an adjustment unit, a position of a light spot that is on the fluorescent antenna and that corresponds to the fluorescent unit.

According to the foregoing two possible designs, when there is the multi-user conflict, the adjustment unit in the optical receiver may adjust the position of the light spot on the fluorescent antenna based on the processing result of the signal processing unit, to narrow an overlapping region between a plurality of light spots, and avoid a multi-user conflict.

In a possible design, the optical receiver converts, by using the signal processing unit, the electrical signal into a digital signal, and determines, based on the digital signal, one or more fluorescent regions corresponding to the incident optical signal.

According to the possible design, the optical receiver converts the electrical signal into a digital signal, and processes the digital signal, to reduce processing complexity and improve signal processing efficiency.

In a possible design, the optical receiver determines, by using the signal processing unit, fluorescent regions corresponding to the same digital signal as fluorescent regions corresponding to the same incident optical signal.

According to the possible design, when the light spot corresponding to the incident optical signal occupies a plurality of fluorescent regions, emergent optical signals converted by the plurality of fluorescent regions are the same, and the emergent optical signals correspond to the same electrical signal and the same digital signal. The signal processing unit may determine, by comparing the digital signals, the fluorescent regions with the same digital signal as the fluorescent regions corresponding to the same incident optical signal.

In a possible design, the optical receiver determines, by using the signal processing unit based on one or more of the following parameters of the digital signal corresponding to each fluorescent region: a waveform, a signal-to-noise ratio, and a signal to interference plus noise ratio, whether there is a multi-user conflict in each fluorescent region, where the multi-user conflict is that a plurality of incident optical signals correspond to one digital signal.

In a possible design, when there is the multi-user conflict in the fluorescent region in the optical receiver, the optical receiver adjusts, by using an adjustment unit, a position of a light spot that is on the fluorescent antenna and that corresponds to the fluorescent region.

According to the foregoing two possible designs, when there is the multi-user conflict, the adjustment unit in the optical receiver may adjust the position of the light spot on the fluorescent antenna based on the processing result of the signal processing unit, to narrow an overlapping region between a plurality of light spots, and avoid the multi-user conflict.

DESCRIPTION OF EMBODIMENTS

Figure 1:
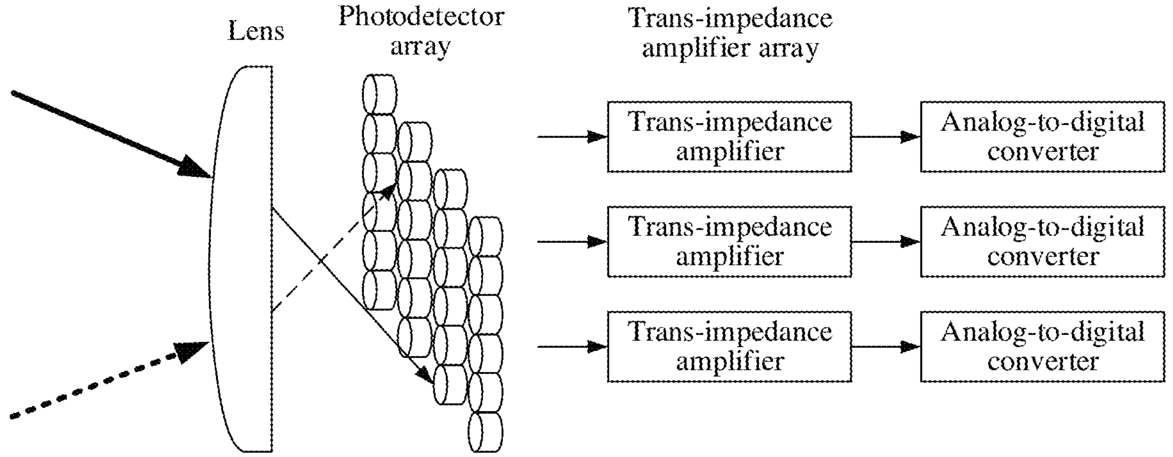
FIG. 1 is a schematic diagram of a structure of an optical receiver according to the conventional technology.
Figure 2:
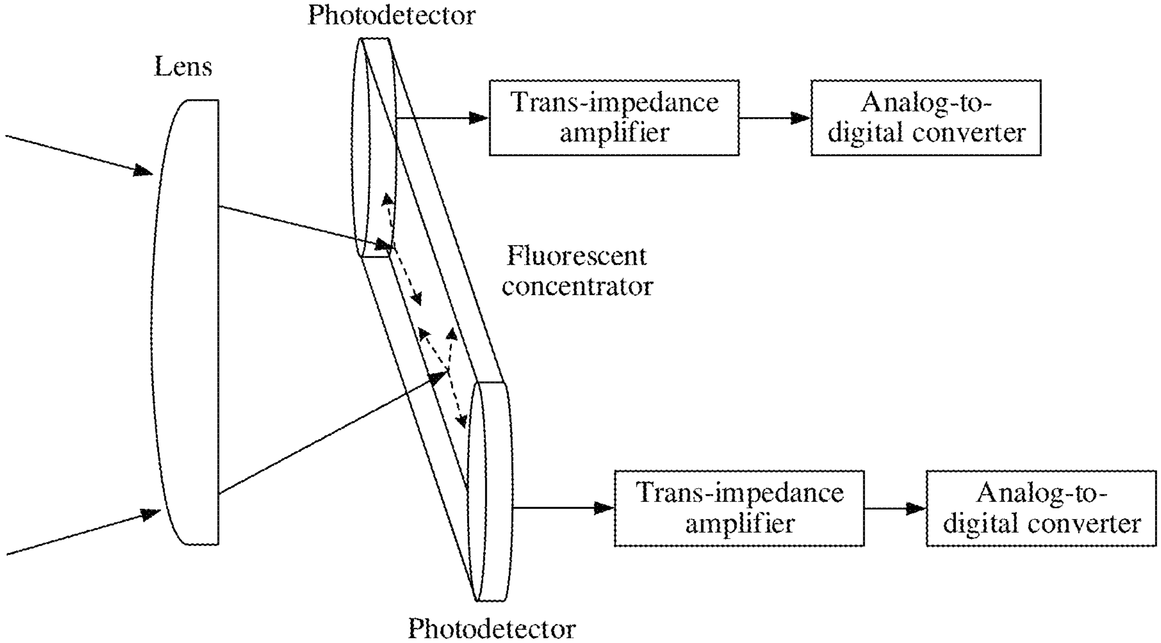
FIG. 2 is a schematic diagram of a structure of an optical receiver according to the conventional technology.

Before embodiments of this application are described, technical terms used in embodiments of this application are described.

Fluorescence: A photoluminescence phenomenon. When a substance is irradiated by light of a specific wavelength, the substance absorbs light energy and enters an excited state. In addition, the substance immediately de-excites and emits an emergent light with a wavelength different from that of an incident light. After the incident light is stopped, the light emitting phenomenon disappears. The emergent light with this characteristic is referred to as fluorescence.

An optical wireless communication (optical wireless communication, OWC) technology is one of the key fields in wireless communication technology. Different from a wireless communication system in a frequency band of 5-6 GHz, 60 GHz, or tera hertz (tera hertz, THz), an optical wireless communication technology has advantages such as a large available bandwidth, a small transmit antenna, and anti-electromagnetic interference. The industry and academia have developed corresponding system solutions for indoor short-distance and outdoor long-distance communication scenarios, and actively carry out system-level test and demonstration and key technology exploration.

A light source and a photodetector in the optical wireless communication system may use broadband devices. A broadband photodetector has a smaller active area (active area), with a diameter in a unit of um, so that high-speed optical wireless communication can be implemented. For example, a high-speed optical wireless communication system solution may be mainly applied to a single-user point-to-point communication scenario or a single-input single-output (single-input single-output, SISO) communication scenario.

To further increase a rate of an optical wireless communication system, or extend an application scenario to multi-user access, a wavelength resource or a spatial domain resource may be used to meet a development requirement of the optical wireless communication system. However, for the wavelength resource, an optical wireless communication transmitter is required to have a multi-wavelength light source for signal transmission, and complexity and costs of an optical wireless communication system are higher. Especially for an optical wireless communication terminal device, when power consumption and a size are limited, a light source wavelength is required to be controllable or a cost of setting a plurality of light sources with different wavelengths is higher. The use of the spatial domain resource does not require that light sources in the optical wireless communication transmitter has different wavelengths, and a solution using the spatial domain resource is simpler and easier to implement than a solution using the wavelength resource. Therefore, making full use of the spatial domain resource to improve performance of the optical wireless communication system is a better technical path, and the optical wireless communication system can be supported to implement multiple-input multiple-output (multiple-input multiple-output, MIMO) and uplink multi-user access.

Corresponding to that the foregoing optical wireless communication transmitter transmits the optical signal by using the spatial domain resource, an optical wireless communication receiver needs to distinguish different optical signals by using the space domain resource, to guide the optical signal to a broadband optoelectronic detector. To be specific, the optical wireless communication receiver needs to have a space division multiplexing capability.

The optical wireless communication transmitter may also be described as an optical transmitter, and the optical wireless communication receiver may also be described as an optical receiver.

Embodiments of this application provide a fluorescent antenna, an optical receiver, and a signal processing method. The fluorescent antenna includes one or more layers of fluorescent arrays, the fluorescent array includes a plurality of fluorescent units, an isolation layer is included between adjacent fluorescent units, the fluorescent unit includes one or more fluorescent regions, and the isolation layer is used to isolate emergent optical signals converted by the adjacent fluorescent units; and when the fluorescent antenna includes one layer of fluorescent array, the fluorescent units are all fluorescent regions; or when the fluorescent antenna includes at least two layers of the fluorescent arrays, the fluorescent unit further includes one or more transparent regions; in two adjacent layers of fluorescent arrays, the transparent region of a first layer of fluorescent array overlaps the fluorescent region of a second layer of fluorescent array; and an incident light signal arrives at the fluorescent region of the second layer of fluorescent array through the transparent region of the first layer of fluorescent array.

In this embodiment of this application, the isolation layer is disposed between the adjacent fluorescent units of the fluorescent antenna, so that emergent optical signals leaked from a current fluorescent unit to another fluorescent unit can be reduced. This reduces interference between the emergent optical signals, increases a quantity of optical signals supported by the optical receiver, enhances a spatial multiplexing capability, increases a communication rate, and effectively supports larger-scale MIMO and uplink multi-user access.

The following describes implementations of embodiments of this application in detail with reference to accompanying drawings in this specification.

An embodiment of this application provides an optical wireless communication system. The optical wireless communication system may include one or more optical transmitters and one or more optical receivers, and the optical receiver may include a fluorescent antenna.

The optical transmitter may modulate and output an optical signal, and the optical receiver may receive an incident optical signal transmitted by the optical transmitter, convert the incident optical signal into an emergent optical signal by using the fluorescent antenna, and then perform subsequent photoelectric conversion and electrical signal processing. The optical transmitter may be applied to a wireless device that serves as a transmit end, or may be a wireless device that serves as a transmit end. The optical receiver may be applied to a wireless device that serves as a receive end, or may be a wireless device that serves as a receive end. The wireless device in embodiments of this application may be a network device and/or a terminal device. The network device may also be described as an OWC network device, and the terminal device may also be described as an OWC terminal device.

For example, the optical wireless communication system provided in embodiments of this application may be applied to an application scenario of uplink multi-user access. A plurality of terminal devices may be separately connected to a network device by using an uplink optical signal.

Figure 3:
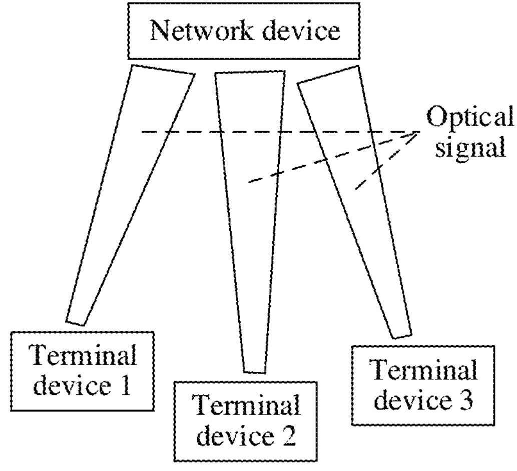
FIG. 3 is a schematic diagram of a structure of an optical wireless communication system according to an embodiment of this application.

For example, as shown in FIG. 3, a terminal device 1, a terminal device 2, and a terminal device 3 may be separately connected to a network device by using an uplink optical signal.

In still another example, the optical wireless communication system provided in embodiments of this application may alternatively be applied to a point-to-point MIMO application scenario. The point-to-point MIMO communication may be performed between network devices, between terminal devices, or between a terminal device and a network device.

Figure 4:
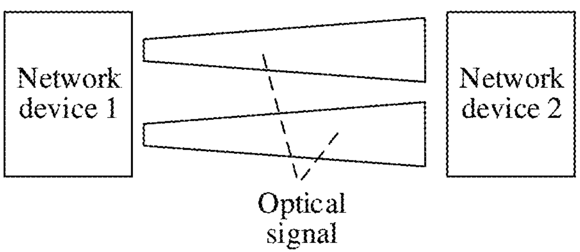
FIG. 4 is a schematic diagram of a structure of an optical wireless communication system according to an embodiment of this application.

For example, as shown in FIG. 4, point-to-point communication may be performed between a network device 1 and a network device 2, and the network device 1 and the network device 2 may perform MIMO communication by using a plurality of optical signals.

The network device may be a base station device, or may be referred to as an access network device or an access node (access node, AN), and provides a radio access service for the terminal device. The access node may be specifically an evolved NodeB (evolutional NodeB, eNB or eNodeB for short) in a long term evolution (long term evolution, LTE) system, a base station device (gNB) in a 5th generation (5th generation, 5G) network, a small cell base station, a radio access node (Wi-Fi AP), a device that undertakes a base station function in device-to-device (device-to-device, D2D)

communication, vehicle-to-everything (vehicle-to-everything, V2X) communication, machine-to-machine (machine-to-machine, M2M) communication, or internet of things (internet of things) communication, or the like. This is not limited in this embodiment of this application.

The terminal device, also referred to as a terminal, user equipment (user equipment, UE), a mobile station (mobile station, MS), a mobile terminal (mobile terminal, MT), or the like, is a device that provides voice and/or data connectivity for a user, for example, a handheld device or an in-vehicle device with a wireless connection function. Currently, for example, some terminals include a wireless network camera, a mobile phone (mobile phone), a tablet computer, a notebook computer, a palmtop computer, a mobile internet device (mobile internet device, MID), a wearable device such as a smartwatch, a virtual reality (virtual reality, VR) device, an augmented reality (augmented reality, AR) device, a wireless terminal in industrial control (industrial control), a wireless terminal in self-driving (self-driving), a wireless terminal in a smart grid (smart grid), a wireless terminal in transportation safety (transportation safety), a wireless terminal in a smart city (smart city), and a wireless terminal in a smart home (smart home).

The following describes in detail a fluorescent antenna, an optical receiver, and a signal processing method provided in embodiments of this application.

An embodiment of this application provides a fluorescent antenna. The fluorescent antenna may include one or more layers of fluorescent arrays, each layer of fluorescent array may include a plurality of fluorescent units, an isolation layer may be included between adjacent fluorescent units, each fluorescent unit may include one or more fluorescent regions, and the isolation layer may be used to isolate emergent optical signals converted by the adjacent fluorescent units.

The fluorescent region may be a region filled with a fluorescent material. The fluorescent unit may convert a received incident optical signal into an emergent optical signal based on a fluorescent effect of the fluorescent region. That the fluorescent unit converts an incident optical signal into an emergent optical signal may also be described as that the fluorescent region of the fluorescent unit converts an incident optical signal into an emergent optical signal, or the fluorescent region converts an incident optical signal into an emergent optical signal.

The fluorescent material may be a material that can implement a photoluminescence effect, including but not limited to a material such as a calcium titanium, a quantum dot, a rare earth, and an organic molecule.

For example, a fluorescent material may be added to a transparent dielectric material to form a fluorescent region, where the transparent dielectric material may be a transparent material such as polymethyl methacrylate (polymethyl methacrylate, PMMA).

In a possible design, when the fluorescent antenna includes one layer of fluorescent array, the fluorescent units are all fluorescent regions.

That the fluorescent units of the fluorescent array are all fluorescent regions may also be described as that an incident optical signal received at any position of the fluorescent antenna may be converted into an emergent optical signal by the fluorescent unit, or may be described as that a projection of the fluorescent region of the fluorescent array to a plane is a complete and continuous plane without a gap.

Figure 5:
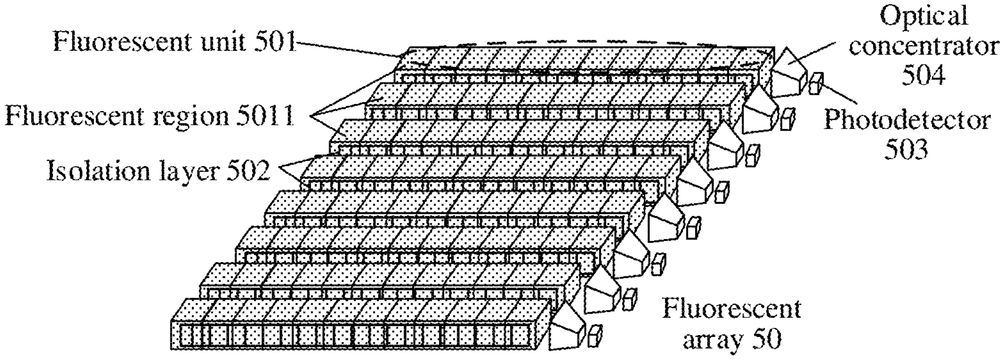
FIG. 5 is a schematic diagram of a structure of a fluorescent antenna according to an embodiment of this application.

For example, as shown in FIG. 5, the fluorescent antenna includes one layer of fluorescent array, for example, a fluorescent array 50. The fluorescent array 50 may include a plurality of fluorescent units. Each row of the fluorescent array 50 shown in FIG. 5 may be one fluorescent unit, for example, a fluorescent unit 501. Each region of each fluorescent unit may be a fluorescent region. For example, each region of the fluorescent unit 501 may be a fluorescent region 5011, and an isolation layer 502 may be included between adjacent fluorescent units.

An incident optical signal received at any position of the fluorescent antenna shown in FIG. 5 may be converted into an emergent optical signal by the fluorescent unit, or a projection of all fluorescent regions of the fluorescent antenna shown in FIG. 5 from a top view is a complete and continuous plane without a gap.

In still another possible design, when the fluorescent antenna includes at least two layers of fluorescent arrays, the fluorescent unit further includes one or more transparent regions. In two adjacent layers of fluorescent arrays, the transparent region of a first layer of fluorescent array overlaps the fluorescent region of a second layer of fluorescent array; and an incident light signal arrives at the fluorescent region of the second layer of fluorescent array through the transparent region of the first layer of fluorescent array.

In this embodiment of this application, in the two adjacent layers of fluorescent arrays, the incident optical signal can only arrive at the fluorescent region of the second layer of fluorescent array through the transparent region of the first layer of fluorescent array, and the transparent region of the first layer of fluorescent array does not definitely correspond to the fluorescent region of the second layer of fluorescent array. For example, when the fluorescent antenna includes three layers of fluorescent arrays, a partial transparent region of a first layer of fluorescent array may overlap a partial transparent region of a second layer of fluorescent array and a fluorescent region of a third layer of fluorescent array. In other words, an incident optical signal may sequentially pass through the transparent region of the first layer of fluorescent array and the transparent region of the second layer of fluorescent array to arrive at the fluorescent region of the third layer of fluorescent array.

The transparent region may be filled with a transparent dielectric material, so that an incident optical signal can pass through the transparent region to arrive at another layer of fluorescent array. The transparent region may also enable an emergent optical signal converted by a fluorescent region to pass through the transparent region and be transmitted in a fluorescent unit to which the fluorescent region belongs.

In the two adjacent layers of fluorescent arrays, that the transparent region of the first layer of fluorescent array overlaps the fluorescent region of the second layer of fluorescent array may also be described as that an incident optical signal received at any position of the fluorescent antenna may at least be converted into an emergent optical signal by a fluorescent unit of one layer of fluorescent array, or may be described as that a projection of the fluorescent regions of the at least two layers of fluorescent arrays to a plane is a complete and continuous plane without a gap.

The transparent region and the fluorescent region in each fluorescent unit may be alternatively arranged, or may not be alternatively arranged; or it may be described as that the transparent region and the fluorescent region in each fluorescent unit may be randomly arranged, but it is required that a projection of the fluorescent region of each layer of fluorescent array of the fluorescent antenna to a plane is a complete and continuous plane without a gap.

In addition, in each layer of fluorescent array of the fluorescent antenna, a fluorescent unit of each layer of fluorescent array may be a transverse fluorescent unit (that is, each row is a fluorescent unit), or may be a longitudinal fluorescent unit (that is, each column is a fluorescent unit). In addition, volumes, sizes, or a quantity of fluorescent regions and transparent regions in the fluorescent antenna may be further preset or set based on an actual communication scenario.

Figure 6:
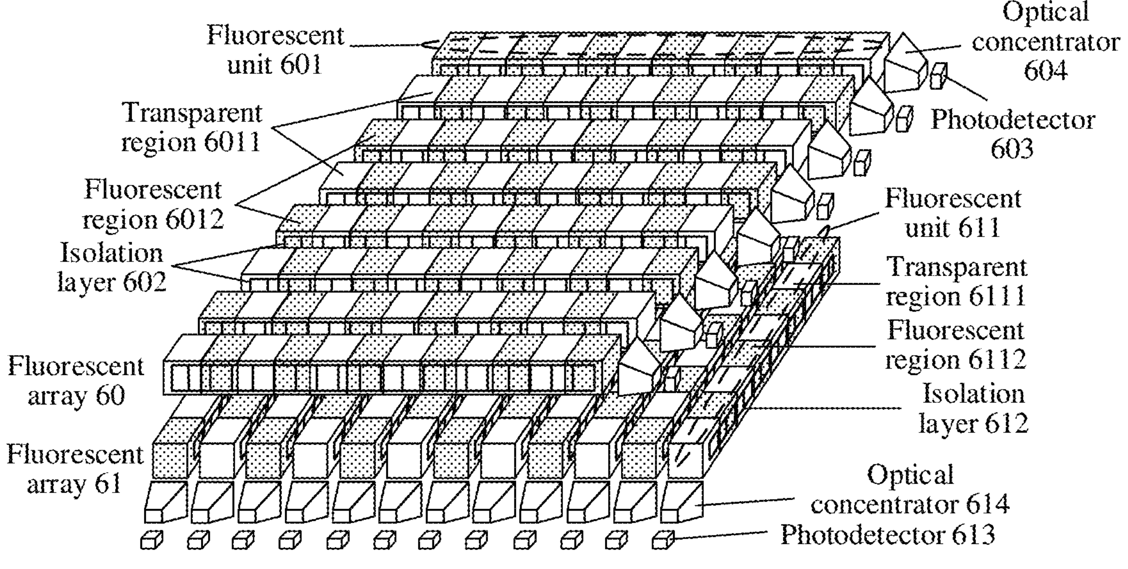
FIG. 6 is a schematic diagram of a structure of a fluorescent antenna according to an embodiment of this application.

For example, as shown in FIG. 6, a fluorescent antenna includes two layers of fluorescent arrays. The two layers of fluorescent arrays may include a fluorescent array 60 and a fluorescent array 61. Each layer of fluorescent array may include a plurality of fluorescent units. Each row of the fluorescent array 60 shown in FIG. 6 may be a fluorescent unit, for example, a fluorescent unit 601. A transparent region and a fluorescent region in each fluorescent unit may be alternately arranged, for example, a transparent region 6011 and a fluorescent region 6012 are alternately arranged, and an isolation layer 602 may be included between adjacent fluorescent units. Each column in the fluorescent array 61 may be a fluorescent unit, for example, a fluorescent unit 611. A transparent region and a fluorescent region in each fluorescent unit may be alternately arranged, for example, a transparent region 6111 and a fluorescent region 6112 are alternately arranged. An isolation layer 612 may be included between adjacent fluorescent units. The transparent region 6011 of the fluorescent array 60 overlaps the fluorescent region 6112 of the fluorescent array 61, so that an incident optical signal can arrive at the fluorescent region 6112 of the fluorescent array 61 through the transparent region 6011 of the fluorescent array 60.

Figure 7:
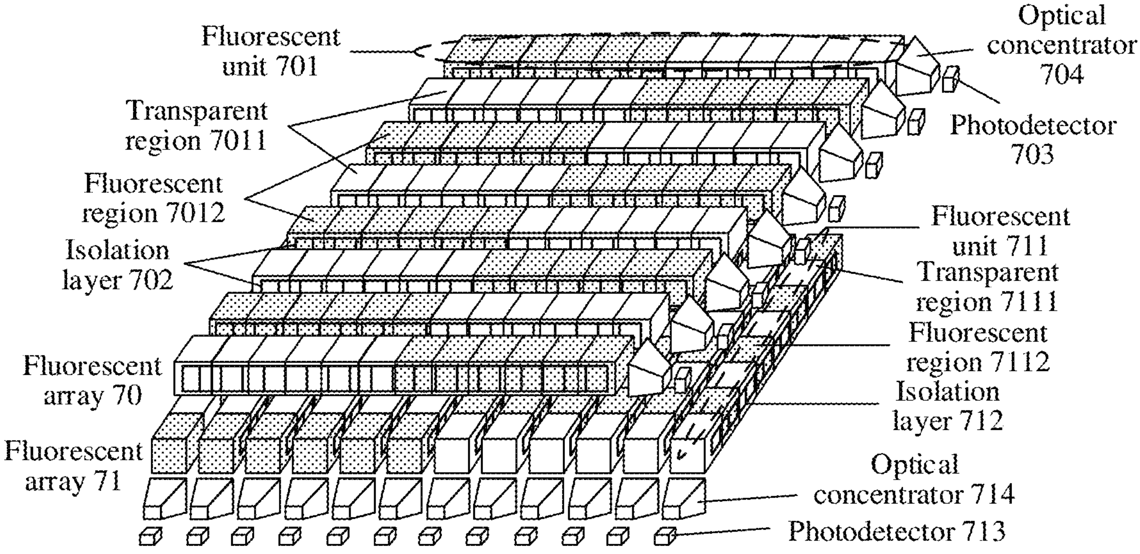
FIG. 7 is a schematic diagram of a structure of a fluorescent antenna according to an embodiment of this application.

In another example, as shown in FIG. 7, a fluorescent antenna includes two layers of fluorescent arrays. The two layers of fluorescent arrays may include a fluorescent array 70 and a fluorescent array 71. Each layer of fluorescent array may include a plurality of fluorescent units. Each row of the fluorescent array 70 shown in FIG. 7 may be a fluorescent unit, for example, a fluorescent unit 701. One side of each fluorescent unit is a transparent region, and the other side is a fluorescent region. For example, one side of the fluorescent unit is a transparent region 7011, and the other side is a fluorescent region 7012, and an isolation layer 702 may be included between adjacent fluorescent units. Each column of the fluorescent array 71 may be a fluorescent unit, for example, a fluorescent unit 711. A transparent region and a fluorescent region in each fluorescent unit may be alternately arranged, for example, a transparent region 7111 and a fluorescent region 7112 are alternately arranged. An isolation layer 712 may be included between adjacent fluorescent units. The transparent region 7011 of the fluorescent array 70 overlaps the fluorescent region 7112 of the fluorescent array 71, so that an incident optical signal can arrive at the fluorescent region 7112 of the fluorescent array 71 through the transparent region 7011 of the fluorescent array 70.

Figure 8:
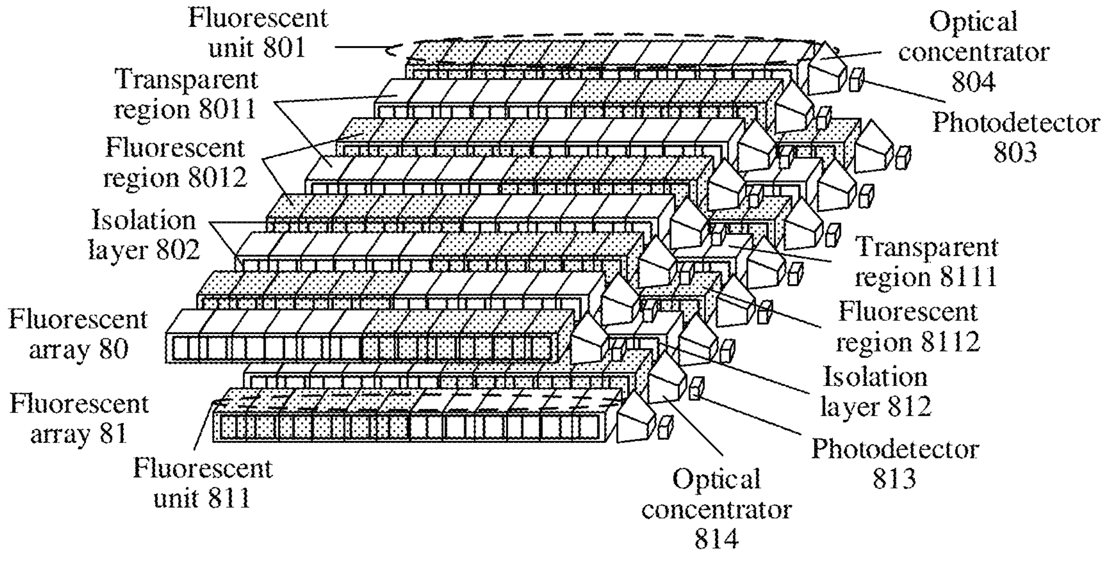
FIG. 8 is a schematic diagram of a structure of a fluorescent antenna according to an embodiment of this application.

In still another example, as shown in FIG. 8, a fluorescent antenna includes two layers of fluorescent arrays. The two layers of fluorescent arrays may include a fluorescent array 80 and a fluorescent array 81. Each layer of fluorescent array may include a plurality of fluorescent units. Each row of the fluorescent array 80 and the fluorescent array 81 shown in FIG. 8 may be a fluorescent unit, for example, a fluorescent unit 801 and a fluorescent unit 811. One side of each fluorescent unit is a plurality of transparent regions, and the other side is a plurality of fluorescent regions. For example, one side of each fluorescent unit in the fluorescent array 80 is a transparent region 8011, and the other side is a fluorescent region 8012. One side of each fluorescent unit in the fluorescent array 81 is a transparent region 8111, and the other side is a fluorescent region 8112. An isolation layer 802 may be included between adjacent fluorescent units in the fluorescent array 80, and an isolation layer 812 may be included between adjacent fluorescent units in the fluorescent array 81. The transparent region 8011 of the fluorescent array 80 overlaps the fluorescent region 8112 of the fluorescent array 81, so that an incident optical signal can arrive at the fluorescent region 8112 of the fluorescent array 81 through the transparent region 8011 of the fluorescent array 80.

Figure 9:
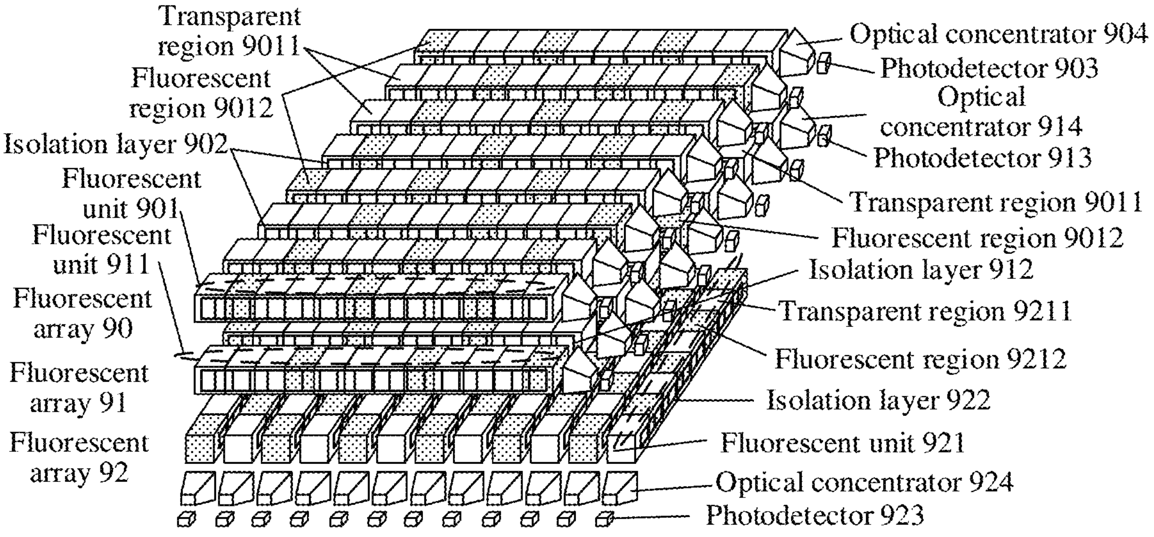
FIG. 9 is a schematic diagram of a structure of a fluorescent antenna according to an embodiment of this application.

In still another example, as shown in FIG. 9, a fluorescent antenna includes three layers of fluorescent arrays. The three layers of fluorescent arrays may include a fluorescent array 90, a fluorescent array 91, and a fluorescent array 92. Each layer of fluorescent array may include a plurality of fluorescent units. Each row of the fluorescent array 90 and the fluorescent array 91 shown in FIG. 9 may be one fluorescent unit, for example, a fluorescent unit 901 and a fluorescent unit 911. A fluorescent region and a transparent region of each fluorescent unit in the fluorescent array 90 and the fluorescent array 91 are randomly arranged. For example, a fluorescent region 9012 and a transparent region 9011 in each fluorescent unit of the fluorescent array 90 are randomly arranged, and a fluorescent region 9112 and a transparent region 9111 in each fluorescent unit of the fluorescent array 91 are randomly arranged. An isolation layer 902 may be included between adjacent fluorescent units in the fluorescent array 90, and an isolation layer 912 may be included between adjacent fluorescent units in the fluorescent array 91. In the transparent region 9011 of the fluorescent array 90, a partial transparent region 9011 overlaps the fluorescent region 9112 of the fluorescent array 91, so that an incident optical signal can arrive at the fluorescent region 9112 of the fluorescent array 91 through the transparent region 9011 of the fluorescent array 90. Each column in the fluorescent array 92 may be a fluorescent unit, for example, a fluorescent unit 921. A transparent region and a fluorescent region of each fluorescent unit in the fluorescent array 91 are alternately arranged, for example, a transparent region 9211 and a fluorescent region 9212 are alternately arranged. An isolation layer 922 may be included between adjacent fluorescent units in the fluorescent array 91. Another partial transparent region 9011 of the fluorescent array 90 overlaps a partial transparent region 9111 of the fluorescent array 91 and the fluorescent region 9212 of the fluorescent array 92, so that an incident optical signal may sequentially pass through the transparent region 9011 of the fluorescent array 90 and the transparent region 9111 of the fluorescent array 91 to arrive at the fluorescent region 9212 of the fluorescent array 92.

Figure 10:
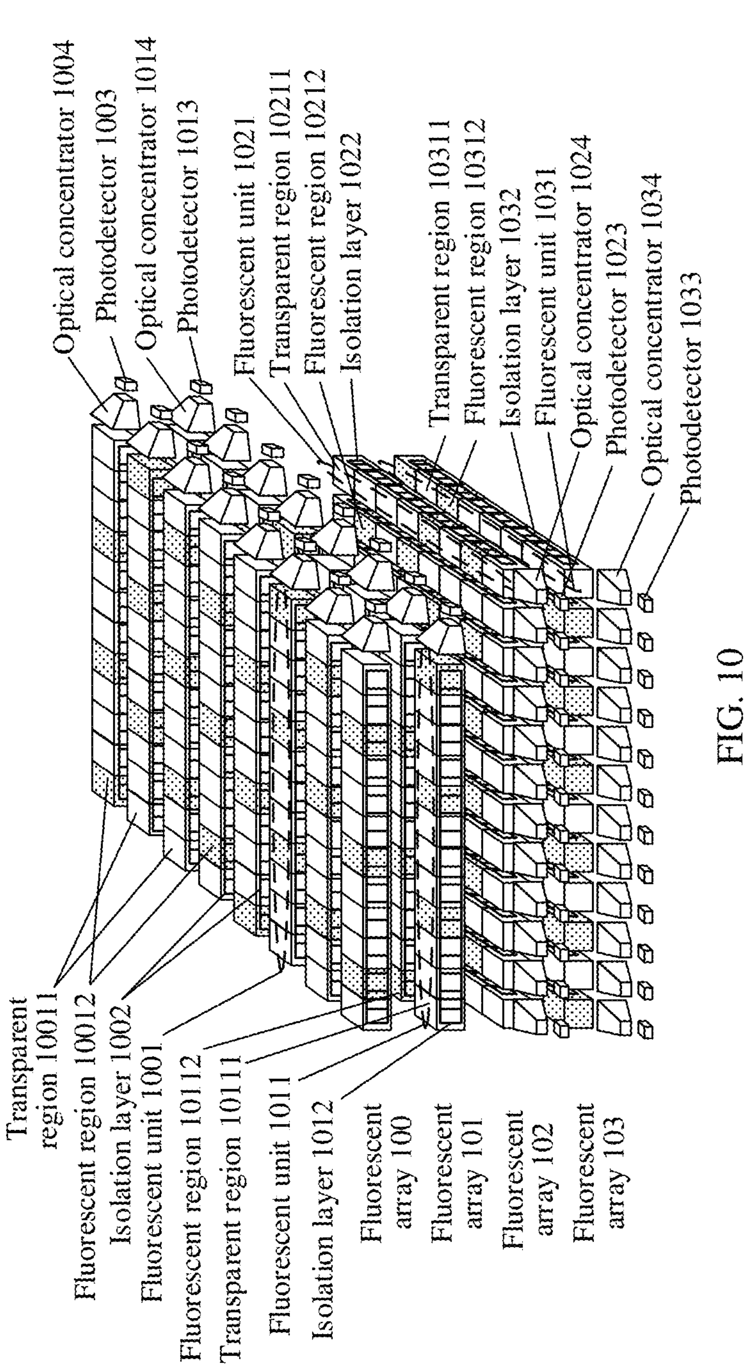
FIG. 10 is a schematic diagram of a structure of a fluorescent antenna according to an embodiment of this application.

In still another example, as shown in FIG. 10, a fluorescent antenna includes four layers of fluorescent arrays. The four layers of fluorescent arrays may include a fluorescent array 100, a fluorescent array 101, a fluorescent array 102, and a fluorescent array 103. Each layer of fluorescent array may include a plurality of fluorescent units. Each row of the fluorescent array 100 and the fluorescent array 101 shown in FIG. 10 may be a fluorescent unit, for example, a fluorescent unit 1001 and a fluorescent unit 1011. A fluorescent region and a transparent region of each fluorescent unit in the fluorescent array 100 and the fluorescent array 101 are randomly arranged. For example, a fluorescent region 10012 and a transparent region 10011 in each fluorescent unit of the fluorescent array 100 are randomly arranged, and a fluorescent region 10112 and a transparent region 10111 in each fluorescent unit of the fluorescent array 101 are randomly arranged. An isolation layer 1002 may be included between adjacent fluorescent units in the fluorescent array 100, and an isolation layer 1012 may be included between adjacent fluorescent units in the fluorescent array 101. Each column of the fluorescent array 102 and the fluorescent array 103 may be a fluorescent unit, for example, a fluorescent unit 1021 and a fluorescent unit 1031. A fluorescent region and a transparent region of each fluorescent unit in the fluorescent array 102 and the fluorescent array 103 are randomly arranged. For example, a fluorescent region 10212 and a transparent region 10211 in each fluorescent unit of the fluorescent array 102 are randomly arranged, and a fluorescent region 10312 and a transparent region 10311 in each fluorescent unit of the fluorescent array 103 are randomly arranged. An isolation layer 1022 may be included between adjacent fluorescent units in the fluorescent array 102, and an isolation layer 1032 may be included between adjacent fluorescent units in the fluorescent array 103. In each transparent region 10011 of the fluorescent array 100, a partial transparent region 10011 overlaps the fluorescent region 10112 of the fluorescent array 101, so that an incident optical signal can arrive at the fluorescent region 10112 of the fluorescent array 101 through the transparent region 10011 of the fluorescent array 100. Another partial transparent region 10011 in the fluorescent array 100 overlaps the partial transparent region 10111 of the fluorescent array 101 and the fluorescent region 10212 of the fluorescent array 102, so that an incident optical signal can sequentially pass through the transparent region 10011 of the fluorescent array 100 and the transparent region 10111 of the fluorescent array 101 to arrive at the fluorescent region 10212 of the fluorescent array 102. Another partial transparent region 10011 in the fluorescent array 100 overlaps the partial transparent region 10111 of the fluorescent array 101, the transparent region 10211 of the fluorescent array 102 and the fluorescent region 10312 of the fluorescent array 103, so that the incident optical signal may sequentially pass through the transparent region 10011 of the fluorescent array 100, the transparent region 10111 of the fluorescent array 101, and the transparent region 10211 of the fluorescent array 102 to arrive at the fluorescent region 10312 of the fluorescent array 103.

According to the fluorescent antenna shown in any one of the foregoing examples in FIG. 6 to FIG. 10, the incident optical signal received at any position of the fluorescent antenna may at least be converted into the emergent optical signal by a fluorescent unit of one layer of fluorescent array, or a projection of all fluorescent regions of the fluorescent antenna from a top view is a complete and continuous plane without a gap.

Further, when the fluorescent antenna includes at least two layers of fluorescent arrays, projections of fluorescent regions of each fluorescent array towards a plane may further be non-overlapping, so that a case in which the fluorescent regions of the two layers of fluorescent arrays overlap can be reduced, each fluorescent region is better used, and a waste of the fluorescent region is reduced.

In the foregoing fluorescent antenna, the isolation layer may be used to isolate the emergent optical signals converted by the fluorescent unit, to reduce emergent optical signals leaked from a current fluorescent unit to an adjacent fluorescent unit, and further reduce interference between emergent optical signals converted by different fluorescent units.

For example, the isolation layer may include one or more of the following: a high reflection layer, a first filter layer, and a dielectric layer.

The first filter layer may be a device that can implement filtering, such as a dielectric film filter or a photonic crystal filter. A refractive index of the dielectric layer may be less than a refractive index of the fluorescent unit.

For example, a degree of isolation of the isolation layer from the emergent optical signal may reach a first threshold.

The first threshold may be preset, or may be set based on an actual communication scenario.

For example, the first threshold may be 50%, 80%, 95%, or 100%.

Optionally, the isolation layer allows the incident optical signal to effectively pass through.

For example, effective passing may indicate that the isolation layer allows an incident optical signal of a second threshold to enter an adjacent fluorescent unit through a current fluorescent unit.

The second threshold may be preset, or may be set based on an actual communication scenario.

For example, the second threshold may be 50%, 80%, 95%, or 100%.

Optionally, when the fluorescent antenna includes at least two layers of fluorescent arrays, a second filter layer is further included between the two adjacent layers of fluorescent arrays.

The second filter layer may be used to isolate emergent optical signals between two adjacent layers of fluorescent arrays, to reduce emergent optical signals leaked from a current fluorescent array to an adjacent fluorescent array, and further reduce interference between emergent optical signals converted by different fluorescent arrays.

For example, the second filter layer may be a device that can implement filtering, such as a dielectric film filter or a photonic crystal filter.

The second filter layer may allow the incident optical signal to enter the adjacent fluorescent array from the current fluorescent array. In other words, the second filter layer does not isolate the incident optical signal.

On the basis of transmission of the incident optical signal, a fluorescent array that first receives the incident optical signal is an upper-layer fluorescent array, and a fluorescent array that receives the incident optical signal later is a lower-layer fluorescent array. The second filter layer may be disposed in all adjacent two layers of fluorescent arrays, or the second filter layer may be disposed only below a fluorescent region of the upper-layer fluorescent array, to avoid a case in which an emergent optical signal converted by the upper-layer fluorescent region leaks to the lower-layer fluorescent array, and reduce interference between emergent optical signals of the upper-layer fluorescent array and the lower-layer fluorescent array.

Further, when the second filter layer is disposed only below the fluorescent region of the upper-layer fluorescent array, the second filter layer may be replaced with an isolation layer, to better implement isolation effect.

Figure 11:
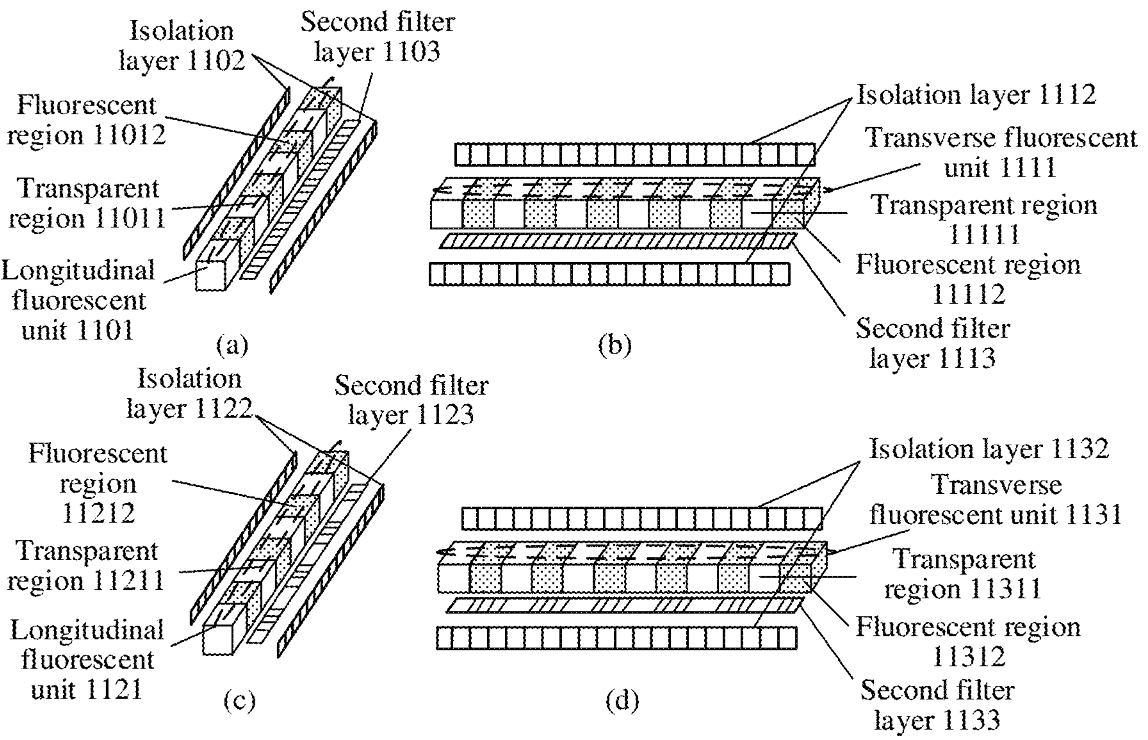
FIG. 11 is a schematic diagram of a structure of a fluorescent unit according to an embodiment of this application.

For example, as shown in (a) in FIG. 11, the upper-layer fluorescent array includes a longitudinal fluorescent unit 1101. The longitudinal fluorescent unit 1101 may include a transparent region 11011 and a fluorescent region 11012. Isolation layers 1102 may be disposed on both sides of the longitudinal fluorescent unit 1101, to avoid a case in which an emergent optical signal converted by the longitudinal fluorescent unit 1101 leaks to an adjacent fluorescent unit. A second filter layer 1103 may be disposed below the longitudinal fluorescent unit 1101, to avoid a case in which an emergent optical signal converted by the longitudinal fluorescent unit 1101 leaks to the lower-layer fluorescent array. An incident optical signal may enter the lower-layer fluorescent array through the transparent region 11011 of the longitudinal fluorescent unit 1101 and the second filter layer

1103 below the transparent region 11011. Then, the fluorescent unit in the lower-layer fluorescent array converts the incident optical signal into an emergent optical signal.

In another example, as shown in (b) in FIG. 11, the upper-layer fluorescent array includes a transverse fluorescent unit 1111. The transverse fluorescent unit 1111 may include a transparent region 11111 and a fluorescent region 11112. Isolation layers 1112 may be disposed on both sides of the transverse fluorescent unit 1111, to avoid a case in which an emergent optical signal converted by the transverse fluorescent unit 1111 leaks to an adjacent fluorescent unit. A second filter layer 1113 may be disposed below the transverse fluorescent unit 1111, to avoid a case in which an emergent optical signal converted by the transverse fluorescent unit 1111 leaks to the lower-layer fluorescent array. An incident optical signal may enter the lower-layer fluorescent array through the transparent region 11111 of the transverse fluorescent unit 1111 and the second filter layer 1113 below the transparent region 11111. Then, the fluorescent unit in the lower-layer fluorescent array converts the incident optical signal into an emergent optical signal.

In still another example, as shown in (c) in FIG. 11, the upper-layer fluorescent array includes a longitudinal fluorescent unit 1121. The longitudinal fluorescent unit 1121 may include a transparent region 11211 and a fluorescent region 11212. Isolation layers 1122 may be disposed on both sides of the longitudinal fluorescent unit 1121, to avoid a case in which an emergent optical signal converted by the longitudinal fluorescent unit 1121 leaks to an adjacent fluorescent unit. A second filter layer 1123 may be disposed below the fluorescent region 11212 of the longitudinal fluorescent unit 1121, and no second filter layer 1123 is disposed below the transparent region 11211, to avoid a case in which an emergent optical signal converted by the longitudinal fluorescent unit 1121 leaks to the lower-layer fluorescent array. In addition, an incident optical signal may enter the lower-layer fluorescent array through the transparent region 11211 of the longitudinal fluorescent unit 1121. Then, the fluorescent unit in the lower-layer fluorescent array converts the incident optical signal into an emergent optical signal.

In still another example, as shown in (d) in FIG. 11, the upper-layer fluorescent array includes a transverse fluorescent unit 1131. The transverse fluorescent unit 1131 may include a transparent region 11311 and a fluorescent region 11312. Isolation layers 1132 may be disposed on both sides of the transverse fluorescent unit 1131, to avoid a case in which an emergent optical signal converted by the transverse fluorescent unit 1131 leaks to an adjacent fluorescent unit. A second filter layer 1133 may be disposed below the fluorescent region 11312 of the transverse fluorescent unit 1131, and no second filter layer 1133 is disposed below the transparent region 11311, to avoid a case in which an emergent optical signal converted by the transverse fluorescent unit 1131 leaks to the lower-layer fluorescent array. In addition, an incident optical signal may enter the lower-layer fluorescent array through the transparent region 11311 of the transverse fluorescent unit 1131. Then, the fluorescent unit in the lower-layer fluorescent array converts the incident optical signal into an emergent optical signal.

Optionally, in the foregoing fluorescent antenna, each fluorescent region is partially or all filled with a fluorescent material.

For example, one fluorescent unit is used as an example. As shown in (a) in FIG. 12, each fluorescent region in the fluorescent unit may be all filled with a fluorescent material. As shown in (b) in FIG. 12, each fluorescent region in the fluorescent unit may be partially filled with a fluorescent material.

Optionally, each fluorescent region of the fluorescent unit is filled with one or more fluorescent materials, and different fluorescent regions are filled with the same fluorescent material or different fluorescent materials.

For example, in one fluorescent unit, all fluorescent regions are filled with one fluorescent material. As shown in (a) in FIG. 13, different fluorescent regions may be filled with the same fluorescent material, for example, a fluorescent material 1. As shown in (b) in FIG. 13, a partial fluorescent region may be filled with the same fluorescent material, for example, a fluorescent material 1, a fluorescent material 2, and a fluorescent material 3. As shown in (c) in FIG. 13, different fluorescent regions may be filled with different fluorescent materials, for example, a fluorescent material 1, a fluorescent material 2, a fluorescent material 4, a fluorescent material 5, a fluorescent material 6, and a fluorescent material 7.

In another example, in one fluorescent unit, all fluorescent regions are filled with two fluorescent materials. As shown in (a) in FIG. 14, different fluorescent regions may be filled with the same fluorescent material. As shown in (b) in FIG. 14, a partial fluorescent region may be filled with the same fluorescent material. As shown in (c) in FIG. 14, different fluorescent regions may be filled with different fluorescent materials.

According to the foregoing descriptions of a quantity of fluorescent materials filled in each fluorescent region, for descriptions of a fluorescent material filled in the partial region of each fluorescent region, refer to the foregoing related descriptions of the fluorescent material filled in an entire region of each fluorescent region. Details are not described again.

Figure 12:
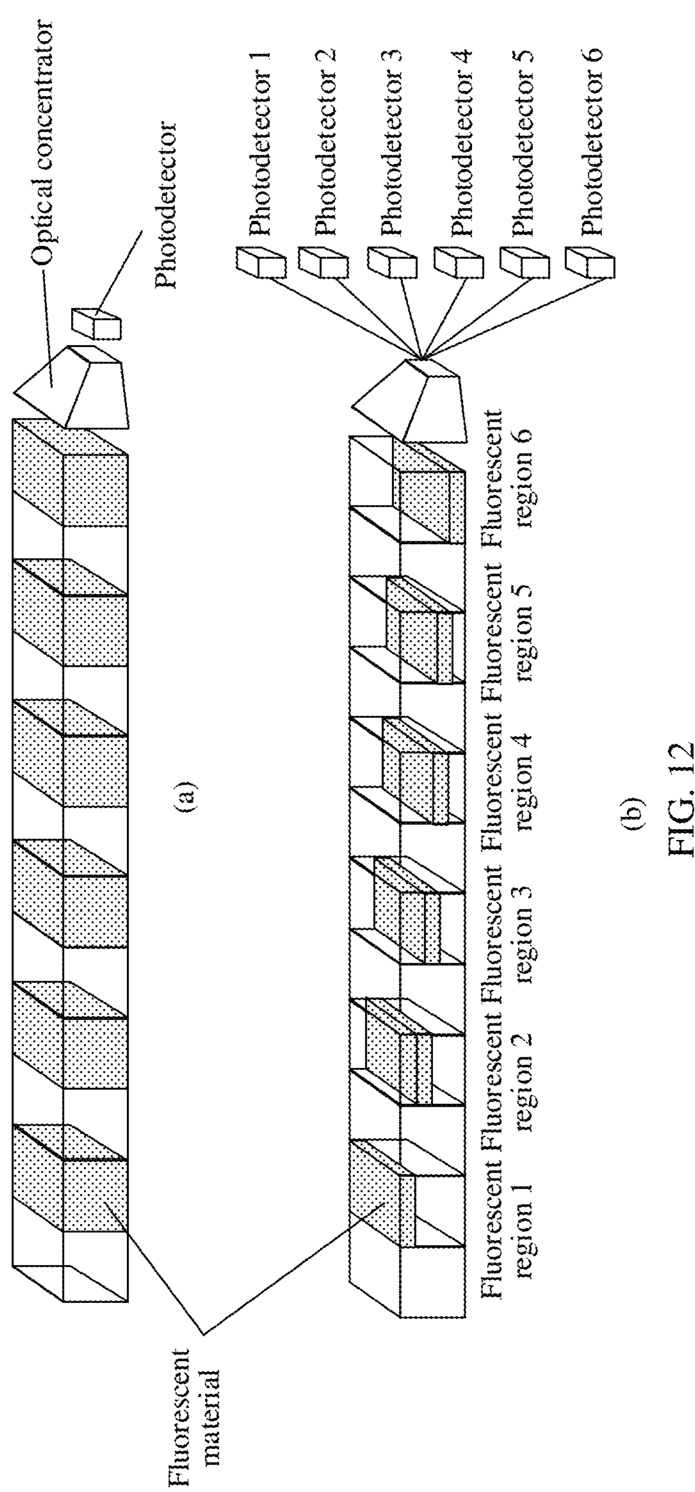
FIG. 12 is a schematic diagram of a structure of a fluorescent unit according to an embodiment of this application.
Figure 13:
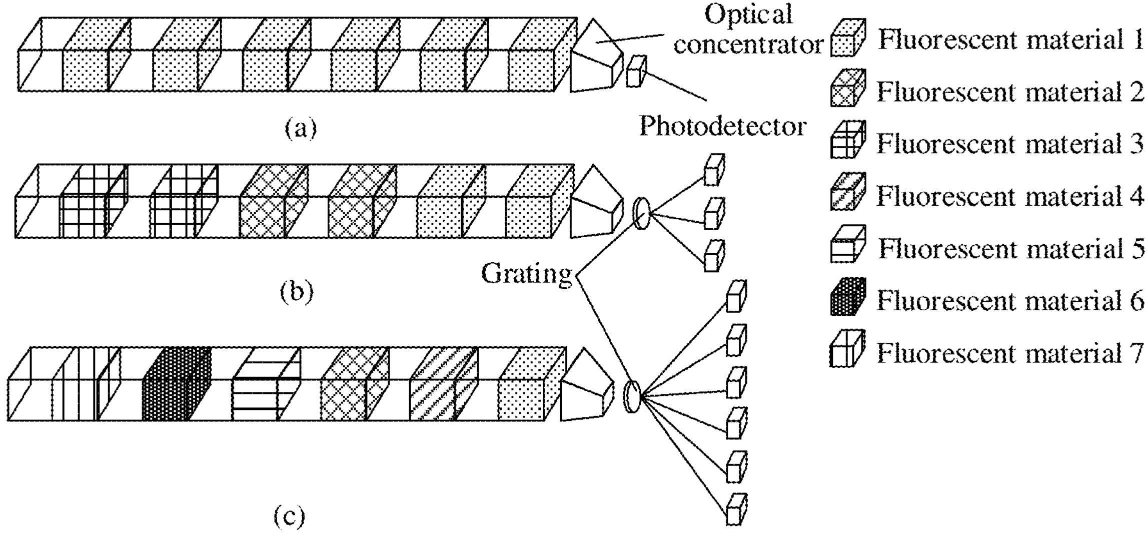
FIG. 13 is a schematic diagram of a structure of a fluorescent unit according to an embodiment of this application.
Figure 14:
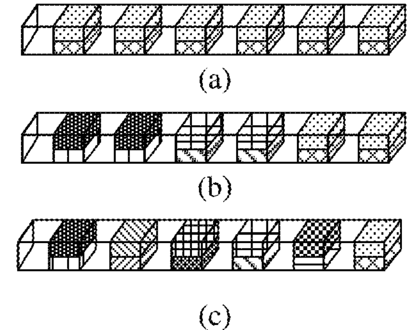
FIG. 14 is a schematic diagram of a structure of a fluorescent unit according to an embodiment of this application.

In FIG. 12 to FIG. 14, an example in which the fluorescent antenna includes at least two layers of fluorescent arrays, and the fluorescent unit of each layer of fluorescent array includes the transparent region and the fluorescent region is used to describe the fluorescent material filled in the fluorescent region. The foregoing descriptions of the fluorescent material filled in the fluorescent region are also applicable to a scenario in which the fluorescent antenna includes one layer of fluorescent array and fluorescent units of the fluorescent array are all fluorescent regions. Details are not described again.

Optionally, when a fluorescent unit includes at least two fluorescent materials, a wavelength of an emergent optical signal corresponding to the fluorescent material decreases in a transmission direction of the emergent optical signal in a dimension of the fluorescent unit.

When the fluorescent antenna is used in the optical receiver, each fluorescent unit of the fluorescent antenna may transmit the emergent optical signal to the photodetector, so that the photodetector converts the emergent optical signal into an electrical signal. A transmission direction of the emergent optical signal is a direction in which the fluorescent unit transmits the emergent optical signal to the photodetector in a dimension of the fluorescent unit.

The decrease in the transmission direction of the emergent optical signal may also be described as an increase in a direction away from the photodetector connected to the fluorescent unit.

For example, the fluorescent unit includes a first fluorescent region and a second fluorescent region, a fluorescent material filled in the first fluorescent region is different from a fluorescent material filled in the second fluorescent region, and a distance between the first fluorescent region and the photodetector is greater than a distance between the second fluorescent region and the photodetector. A wavelength of an emergent optical signal converted by the first fluorescent region may be greater than a wavelength of an emergent optical signal converted by the second fluorescent region.

Figure 15:
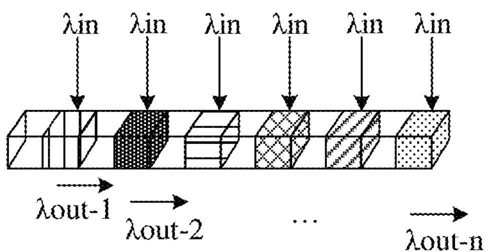
FIG. 15 is a schematic diagram of a structure of a fluorescent unit according to an embodiment of this application.

For example, as shown in FIG. 15, a fluorescent unit includes n fluorescent regions, and the n fluorescent regions are filled with n fluorescent materials. In an example in which a fluorescent unit transmits an emergent optical signal to a photodetector from left to right, a fluorescent region closest to the photodetector may be numbered n, and a number of a fluorescent region away from the photodetector is subtracted by 1 on the basis of n, that is, n−1, n−2, n−3, . . . , 2, and 1, matching a number of the fluorescent region. A fluorescent material filled in an $n^{th}$ fluorescent region is defined as an $n^{th}$ fluorescent material, a wavelength of an emergent optical signal output by the $n^{th}$ fluorescent material is λout_n, and a wavelength of an emergent optical signal output by the first fluorescent material is λout_1. The fluorescent material of each fluorescent region is adjusted, so that a wavelength of an emergent optical signal of each fluorescent region meets λout_1>λout_2>λout_3> . . . >λout_n, to ensure that emergent optical signals converted by different fluorescent regions are efficiently transmitted to the photodetector.

For example, n=5 is used as an example. Fluorescent materials filled in the five fluorescent regions may be respectively shown in the following Table 1.

For example, as shown in FIG. 15, λout_1>λabs_2−n, λout_2>λabs_3−n, . . . , and λout_n−1>λabs_n, where λout_n is a wavelength of an emergent optical signal of an nth fluorescent material, and λabs_n is a longest wavelength covered by an absorption spectrum of the nth fluorescent material.

Optionally, the fluorescent unit uses a flexible substrate to implement a fluorescent array and a fluorescent antenna in a braid manner.

In the figures provided in embodiments of this application, a pattern corresponding to the fluorescent region is merely used to distinguish between the fluorescent region and the transparent region, and different patterns in the fluorescent region are merely used to indicate different filled fluorescent materials, and do not represent a specific fluorescent material.

According to the fluorescent antenna shown in any one of FIG. 6 to FIG. 15, the isolation layer is disposed between the adjacent fluorescent units of the fluorescent antenna, so that emergent optical signals leaked from a current fluorescent unit to another fluorescent unit can be reduced. This reduces interference between the emergent optical signals, increases a quantity of optical signals supported by the optical receiver, enhances a spatial multiplexing capability, increases a communication rate, and effectively supports larger-scale MIMO and uplink multi-user access.

Based on the foregoing fluorescent antenna, an embodiment of this application further provides an optical receiver.

TABLE 1

| Category | 5 | 4 | 3 | 2 | 1 |
|---|---|---|---|---|---|
| Perovskite (Different components) | $CsPbCl_3$ | $CsPb(Br/Cl)_3$ | $CsPbBr_3$ | $CsPb(I/Br)_3$ | $CsPbI_3$ |
| Inorganic quantum dot (Different particle sizes) | PbSe_2 nm | PbSe_4 nm | PbSe_6 nm | PbSe_8 nm | PbSe_10 nm |

In the fluorescent antenna, an absorption spectrum of a fluorescent material filled in each fluorescent region needs to cover a wavelength of an incident optical signal, so that the fluorescent region can absorb the incident optical signal, and convert the incident optical signal into an emergent optical signal, that is, λin<λabs_1, . . . , and λin<λabs_n, where λin is the wavelength of the incident optical signal, and λabs_n is the longest wavelength covered by an absorption spectrum of the $n^{th}$ fluorescent material.

Further, in the fluorescent unit, the wavelength of the emergent optical signal corresponding to the fluorescent material used in the fluorescent region far away from the photodetector may be greater than the absorption spectrum of the fluorescent material used in the fluorescent region close to the photodetector, so that a case in which the emergent optical signal in the fluorescent region is re-absorbed by another fluorescent region can be avoided in a transmission process, to ensure energy of the emergent optical signal and improve transmission efficiency.

For example, the fluorescent unit includes a first fluorescent region and a second fluorescent region, a fluorescent material filled in the first fluorescent region is different from a fluorescent material filled in the second fluorescent region, and a distance between the first fluorescent region and the photodetector is greater than a distance between the second fluorescent region and the photodetector. A wavelength of an emergent optical signal converted by the first fluorescent region may be greater than an absorption spectrum of the filled fluorescent material.

Figure 16A:
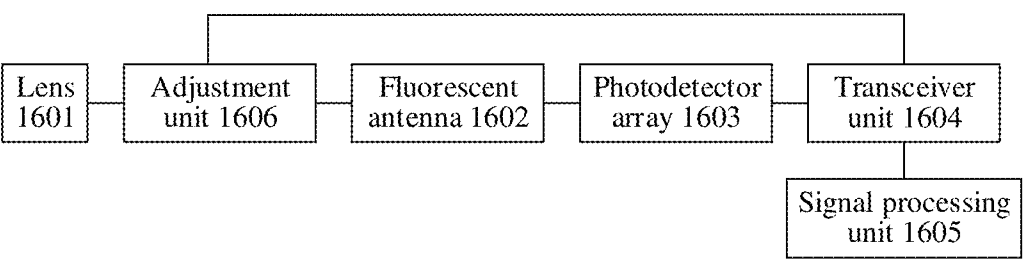
FIG. 16*a* is a schematic diagram of a structure of an optical receiver according to an embodiment of this application.
Figure 16B:
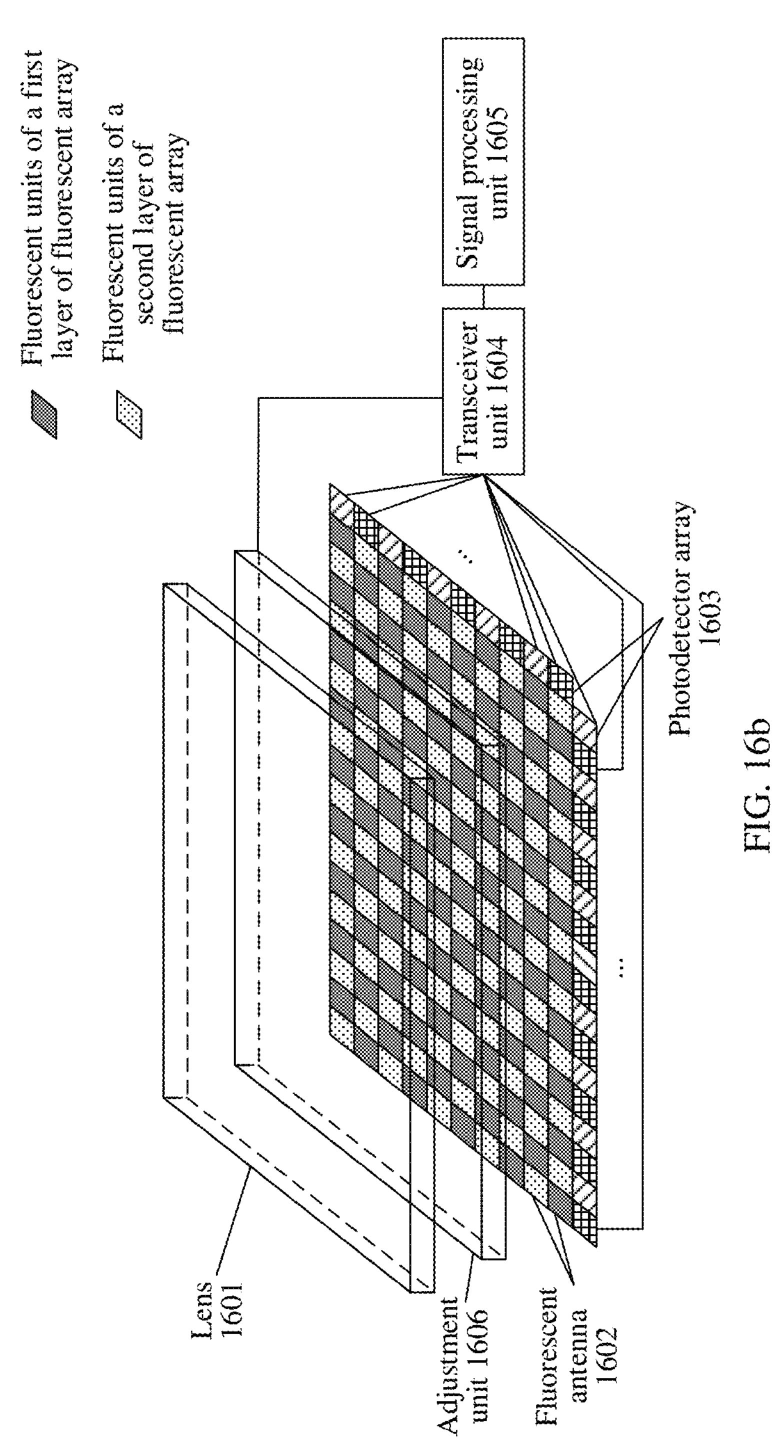
FIG. 16*b* is a schematic diagram of a structure of an optical receiver according to an embodiment of this application.

As shown in FIG. 16*a* or FIG. 16*b*, the optical receiver may include a lens 1601, a fluorescent antenna 1602, and a photodetector array 1603.

The lens 1601 may be configured to receive an incident optical signal, and the incident optical signal passing through the lens 1601 may be converged on the fluorescent antenna 1602 to form a light spot.

For example, the lens 1601 may be a lens such as a light converging lens, an imaging lens, a Fresnel lens, a metasurface lens, a light converging metasurface lens, a convex lens, a fisheye lens, or a lens group.

For description of the fluorescent antenna 1602, refer to the foregoing description of the fluorescent antenna. Details are not described again.

The photodetector array 1603 may include a plurality of photodetectors. Each fluorescent unit of the fluorescent antenna 1602 may be connected to one or more photodetectors. The photodetector may be configured to convert an emergent optical signal into an electrical signal.

For example, the photodetector may be an avalanche photodiode (avalanche photodiode, APD), a PIN photodiode (PIN-PD), or the like.

The fluorescent unit may be coupled to or decoupled from one or more photodetectors connected to the fluorescent unit.

In a possible design, when the fluorescent antenna includes one layer of fluorescent array, each fluorescent unit of the fluorescent array is connected to one photodetector.

For example, as shown in FIG. 5, each fluorescent unit is connected to one photodetector. For example, the fluorescent unit 501 is connected to the photodetector 503.

In still another possible design, when the fluorescent antenna includes at least two layers of fluorescent arrays, each fluorescent unit of each layer of fluorescent array is connected to one photodetector. For example, the fluorescent unit 601 is connected to the photodetector 603, and the fluorescent unit 611 is connected to the photodetector 613.

For example, in the fluorescent antenna shown in any one of FIG. 6 to FIG. 10, each fluorescent unit of each layer of fluorescent array is connected to one photodetector. For example, the fluorescent unit 601 is connected to the photodetector 603, and the fluorescent unit 611 is connected to the photodetector 613. The fluorescent unit 701 is connected to the photodetector 703, and the fluorescent unit 711 is connected to the photodetector 713. The fluorescent unit 801 is connected to the photodetector 803, and the fluorescent unit 811 is connected to the photodetector 813. The fluorescent unit 901 is connected to the photodetector 903, the fluorescent unit 911 is connected to the photodetector 913, and the fluorescent unit 921 is connected to the photodetector 923. The fluorescent unit 1001 is connected to the photodetector 1003, the fluorescent unit 1011 is connected to the photodetector 1013, the fluorescent unit 1021 is connected to the photodetector 1023, and the fluorescent unit 1031 is connected to the photodetector 1033.

In still another possible design, when the fluorescent unit corresponds to one fluorescent material, if each fluorescent region of the fluorescent unit is all filled with the fluorescent material, the fluorescent unit is connected to one photodetector; or if each fluorescent region of the fluorescent unit is partially filled with the fluorescent material, the fluorescent unit is connected to a plurality of photodetectors.

For example, as shown in (a) in FIG. 12, the fluorescent unit may be connected to one photodetector.

In still another example, when the fluorescent material does not occupy the entire fluorescent region, for example, the fluorescent material is distributed in a specific plane of the fluorescent region in a form of a layered structure, as shown in (b) in FIG. 12, all fluorescent regions are filled with the same fluorescent material, the fluorescent material forms a functional layer, positions of the fluorescent material in the fluorescent regions are different, and functional layers of the fluorescent material do not overlap in spatial distribution. In this case, the fluorescent unit may be connected to a plurality of photodetectors. Different photodetectors may correspond to different functional layers of the fluorescent material. For example, a fluorescent region 1 to a fluorescent region 6 respectively correspond to a photodetector 1 to a photodetector 6, to implement spatial multiplexing. In addition, emergent optical signals converted by different functional layers of the fluorescent material correspond to different photodetectors, to reduce interference between the emergent optical signals, increase a quantity of optical signals supported by the optical receiver, and improve transmission efficiency.

The functional layer of the fluorescent material may be a metasurface formed by combining gold Au or silver Ag, and may adjust and control a direction of the emergent optical signal.

In still another possible design, when the fluorescent unit corresponds to a plurality of fluorescent materials, the fluorescent unit is connected to a plurality of photodetectors.

Fluorescent regions filled with different fluorescent materials may correspond to different photodetectors.

For example, as shown in FIG. 13(*b*) and FIG. 13(*c*), fluorescent regions filled with the same fluorescent material may correspond to the same photodetector, and fluorescent regions filled with different fluorescent materials may correspond to different photodetectors. As shown in FIG. 13(*b*), fluorescent regions may correspond to three photodetectors, and as shown in FIG. 13(*c*), fluorescent regions may correspond to six photodetectors.

In FIG. 12 and FIG. 13, an example in which the fluorescent antenna includes at least two layers of fluorescent arrays, and the fluorescent unit of each layer of fluorescent array includes the transparent region and the fluorescent region is used to describe a quantity of photodetectors connected to the fluorescent units. The foregoing descriptions of the quantity of photodetectors connected to the fluorescent units are also applicable to a scenario in which the fluorescent antenna includes one layer of fluorescent array and fluorescent units of the fluorescent array are all fluorescent regions. Details are not described again.

Optionally, a grating shown in FIG. 13 is disposed between the fluorescent unit and the photodetector, and emergent optical signals of different wavelengths are transmitted to different photodetectors by using the grating, to reduce interference between the emergent optical signals of different wavelengths.

Alternatively, a third filter layer is disposed in the photodetector.

The third filter layer may be used to allow one of emergent optical signals of at least two wavelengths corresponding to the fluorescent unit to pass through.

When the fluorescent unit includes at least two fluorescent materials, the fluorescent unit may correspond to the emergent optical signals of at least two wavelengths. In this case, the fluorescent unit may be connected to at least two photodetectors. The third filter layer is disposed on the photodetector, and the emergent optical signals of a wavelength corresponding to the photodetector may be filtered out by using the third filter layer, so that the photodetector processes the emergent optical signals that are filtered out, to reduce interference between the emergent optical signals of different wavelengths.

The grating and the filter layer may also be used in combination.

Optionally, the optical receiver further includes an optical concentrator, and the fluorescent unit is connected, by using the optical concentrator, to a photodetector corresponding to the fluorescent unit.

For example, refer to the fluorescent antenna shown in any one of FIG. 5 to FIG. 10, FIG. 12, and FIG. 13. The fluorescent unit of the fluorescent antenna may be connected, by using an optical concentrator, to a photodetector corresponding to the fluorescent unit.

The optical receiver converges the emergent optical signal by using the optical concentrator, to ensure energy of the emergent optical signal.

When the fluorescent unit is connected to the photodetector by using the grating, the fluorescent unit may be connected to the photodetector by using the optical concentrator and the grating in sequence.

Further, as shown in FIG. 16*a* or FIG. 16*b*, the optical receiver may further include a transceiver unit 1604 and a signal processing unit 1605.

The transceiver unit 1604 may be configured to receive an electrical signal sent by the photodetector. The signal processing unit 1605 may process the electrical signal to obtain a processing result, and the transceiver unit 1604 is further configured to send the processing result generated by the signal processing unit 1605.

For example, the transceiver unit 1604 may receive, by using an SMA (subminiature version A), a microstrip, a strip line, or the like, the electrical signal sent by the photodetector.

For example, the signal processing unit 1605 may include an analog signal processing unit and a digital signal processing unit. The analog signal processing unit may convert an electrical signal into a digital signal, and the digital signal processing unit may further process the digital signal to obtain a processing result.

For example, the analog signal processing unit may be an analog-to-digital converter (analog-to-digital converter, ADC), and the digital signal processing unit may be a general-purpose or dedicated digital logic circuit, including but not limited to a field programmable gate array (field programmable gate array, FPGA), an application-specific integrated circuit (application-specific integrated circuit, ASIC), a central processing unit (central processing unit, CPU), and the like. For example, the transceiver unit 1604 may further send the processing result by using an interface such as a serial peripheral interface (serial peripheral interface, SPI), a general-purpose input/output (general-purpose input/output, GPIO), a serial/parallel circuit (serializing/deserializing circuitry, SerDes), a low-voltage differential signaling (low-voltage differential signaling, LVDS) interface, or the like.

Further, as shown in FIG. 16*a* or FIG. 16*b*, the optical receiver may further include an adjustment unit 1606.

The adjustment unit 1606 may be configured to adjust a position of a light spot that is on the fluorescent antenna and that is converged by a lens.

For example, the adjustment unit 1606 may be an adjustable metasurface, a spatial light modulator, or micro-electro-mechanical systems (micro-electro-mechanical systems, MEMS).

Figure 17:
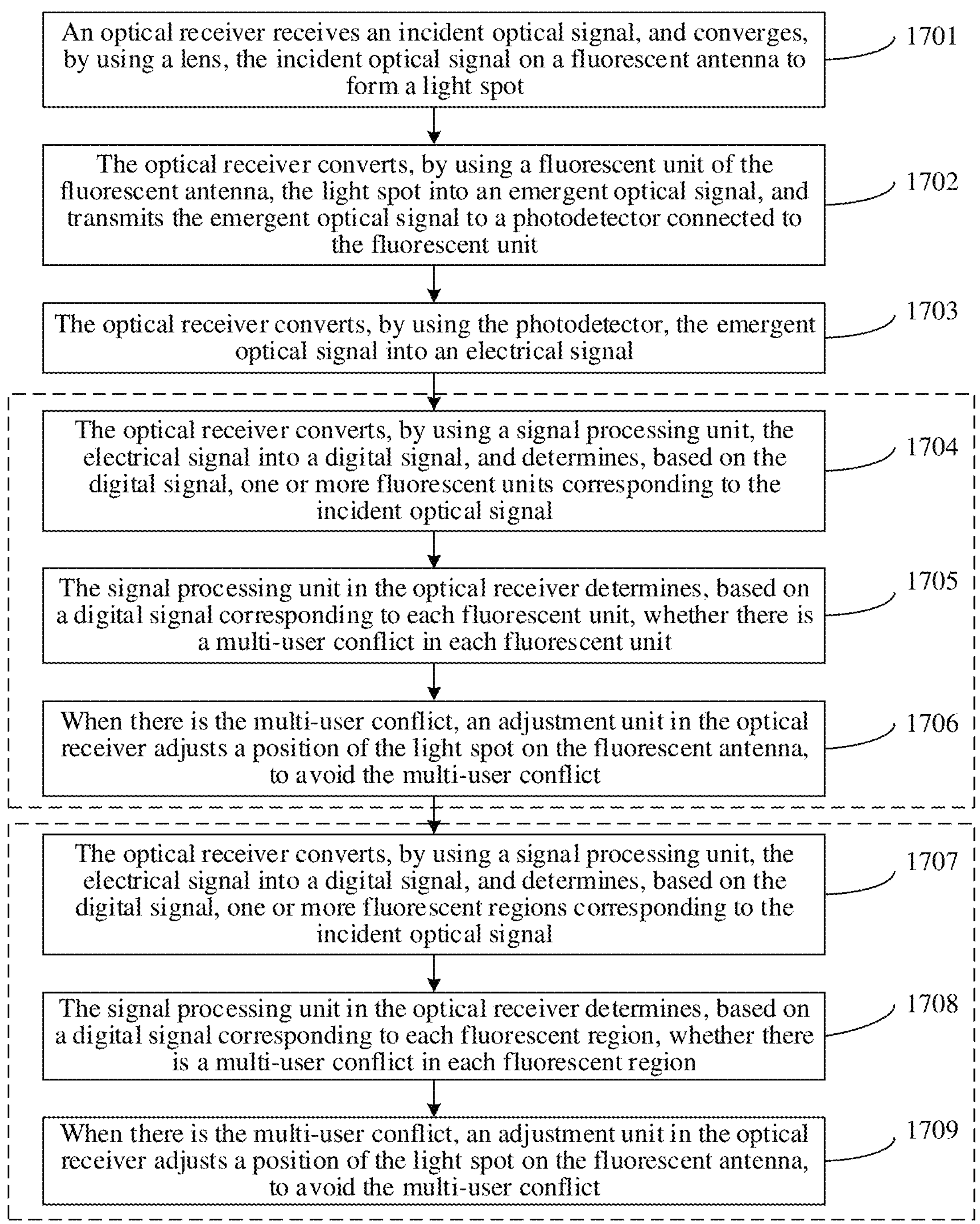
FIG. 17 is a flowchart of a signal processing method according to an embodiment of this application.

The adjustment unit 1606 may be further connected to the transceiver unit 1604, to receive, based on a signal processing method shown in FIG. 17, the processing result sent by the transceiver unit 1604, and adjust, based on the processing result, the position of the light spot that is on the fluorescent antenna and that is converged by the lens.

In FIG. 16*b* in this embodiment of this application, only an example in which the fluorescent antenna includes two layers of fluorescent arrays is used to describe the optical receiver. The fluorescent antenna in FIG. 16*b* may alternatively be any fluorescent antenna mentioned in the foregoing embodiments.

In this embodiment of this application, the fluorescent antenna is disposed in the receiver, so that a signal processing capability of the optical receiver can be enhanced. In addition, when a size and complexity of the optical receiver are limited, if multi-user access is implemented in terms of wavelength, implementation complexity and costs of a terminal device are higher, and there are wavelength scheduling overheads in a multi-user access process. However, the foregoing problem can be overcome by implementing uplink multi-user access in terms of space. In addition, a fluorescent antenna based on a fluorescent effect is insensitive to an incident direction of an optical signal, that is, performance of receiving an incident optical signal at different angles is the same, so that communication link stability can be ensured in a multi-user moving scenario.

According to the foregoing descriptions of the fluorescent antenna and the optical receiver, as shown in FIG. 17, an embodiment of this application further provides a signal processing method. The method may be applied to the foregoing optical receiver including the fluorescent antenna, and the method may include the following steps.

Step 1701: The optical receiver receives an incident optical signal, and converges, by using a lens, the incident optical signal on a fluorescent antenna to form a light spot.

The lens in the optical receiver may converge, on the fluorescent antenna, an incident optical signal transmitted by one user into one light spot, or may converge, on the fluorescent antenna, incident optical signals transmitted by a plurality of users into a plurality of discrete light spots.

Figure 18:
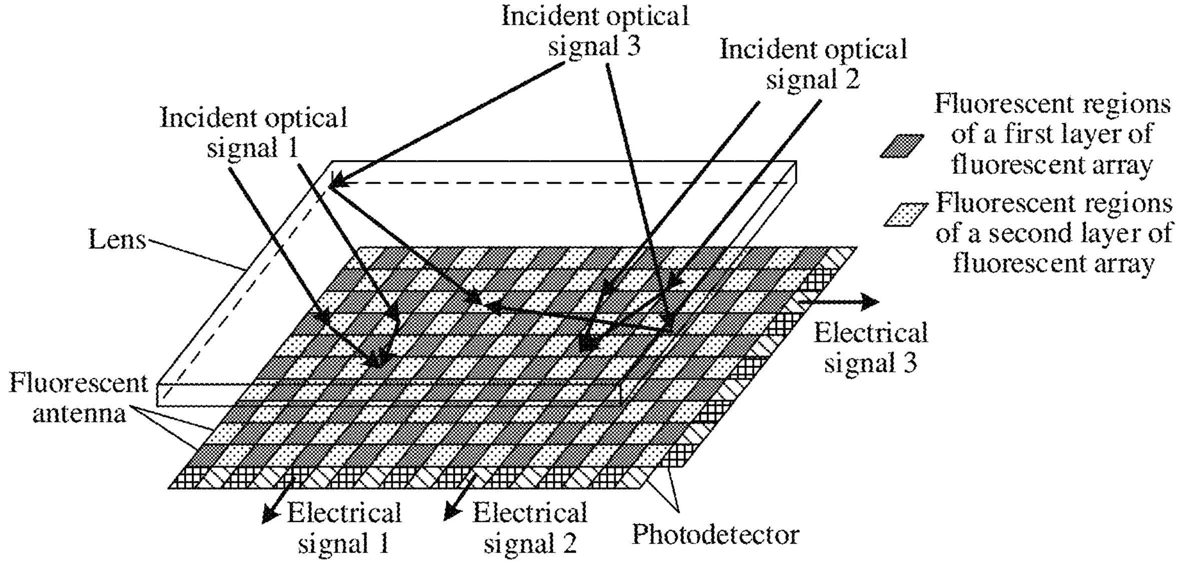
FIG. 18 is a schematic diagram of a structure of a signal processing method according to an embodiment of this application.
Figure 19:
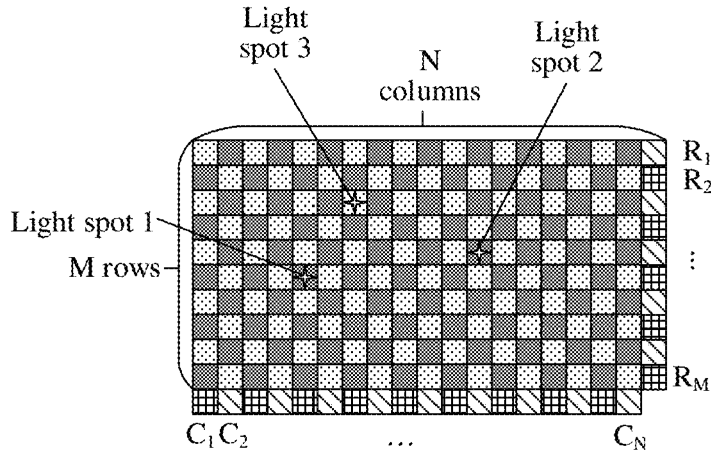
FIG. 19 is a schematic diagram of a structure of a signal processing method according to an embodiment of this application.

For example, the fluorescent antenna includes two layers of fluorescent arrays, each column in a first layer of fluorescent array is one fluorescent unit, and N fluorescent units may be included; and each row in a second layer of fluorescent array is one fluorescent unit, and M fluorescent units may be included. As shown in FIG. 18 and FIG. 19, a lens in an optical receiver may converge an incident optical signal 1 on the first layer of fluorescent array to form a light spot 1; converge an incident optical signal 2 on the first layer of fluorescent array to form a light spot 2; and converge an incident optical signal 3 on the second layer of fluorescent array to form a light spot 3.

Step 1702: The optical receiver converts, by using a fluorescent unit of the fluorescent antenna, the light spot into an emergent optical signal, and transmits the emergent optical signal to a photodetector connected to the fluorescent unit.

After converging the incident optical signal on the fluorescent antenna, the lens in the optical receiver may trigger a fluorescent region in which the light spot is located to convert, based on a fluorescent effect, incident optical signal into an emergent optical signal, and transmit the emergent optical signal to a photodetector connected to the fluorescent unit in which the light spot is located.

For example, as shown in FIG. 18 and FIG. 19, for example, N fluorescent units in the first layer of fluorescent array are respectively connected to photodetectors $C_1$, $C_2$, . . . , and $C_N$, and M fluorescent units in the second layer of fluorescent array are respectively connected to photodetectors $R_1$, $R_2$, . . . , and $R_M$. A fluorescent region corresponding to the light spot 1 may be converted into an emergent optical signal based on a fluorescent effect, and the emergent optical signal is transmitted to the photodetector, for example, $C_5$. A fluorescent region corresponding to the light spot 2 may be converted into an emergent optical signal based on a fluorescent effect, and the emergent optical signal is transmitted to the photodetector, for example, $C_{12}$. A fluorescent region corresponding to the light spot 3 may be converted into an emergent optical signal based on a fluorescent effect, and the emergent optical signal is transmitted to the photodetector, for example, $R_3$.

Step 1703: The optical receiver converts, by using the photodetector, the emergent optical signal into an electrical signal.

The photodetector in the optical receiver may convert the received emergent optical signal into the electrical signal based on photoelectric conversion.

For example, as shown in FIG. 18 and FIG. 19, the photodetector $C_5$ may convert an emergent optical signal corresponding to the incident optical signal 1 into an electrical signal 1; the photodetector $C_{12}$ may convert an emergent optical signal corresponding to the incident optical signal 2 into an electrical signal 2; and the photodetector $R_3$ may convert an emergent optical signal corresponding to the incident optical signal 3 into an electrical signal 3.

As shown in FIG. 18 and FIG. 19, a quantity of different incident optical signals that can be simultaneously processed by the optical receiver is M+N. That is, when M+N incident optical signals respectively correspond to M+N fluorescent units, the fluorescent antenna may convert the M+N incident optical signals into M+N emergent optical signals, where the M+N emergent optical signals are separated by an isolation layer between the fluorescent units, so that interference between the emergent optical signals can be reduced.

Further, as shown in FIG. 17, the optical receiver may further process the electrical signal based on the following step 1704, to determine one or more fluorescent units corresponding to each incident optical signal. Further, the optical receiver may further determine, based on the following step 1705, whether there is a multi-user conflict in each fluorescent unit.

Step 1704: The optical receiver converts, by using a signal processing unit, the electrical signal into a digital signal, and determines, based on the digital signal, one or more fluorescent units corresponding to the incident optical signal.

When the light spot converged by the incident optical signal corresponds to one fluorescent region, the signal processing unit may determine, based on the digital signal, a photodetector corresponding to the digital signal, and determine a fluorescent unit connected to the photodetector as a fluorescent unit corresponding to the incident optical signal.

For example, as shown in FIG. 18 and FIG. 19, that the light spot 1 converged by the incident optical signal 1 corresponds to one fluorescent region is used as an example. A fluorescent unit corresponding to the light spot may generate the emergent optical signal based on the fluorescent effect, and transmit the emergent optical signal to the photodetector $C_5$. The photodetector $C_5$ converts the received emergent optical signal into an electrical signal and transmits the electrical signal to the signal processing unit. The signal processing unit converts the electrical signal into a digital signal. It may be determined, based on the digital signal, that the digital signal is generated based on the electrical signal sent by the photodetector $C_5$, and then it may be determined that the fluorescent unit corresponding to the incident light signal 1 is the fluorescent unit connected to the photodetector $C_5$.

When the light spot converged by the incident optical signal corresponds to a plurality of fluorescent regions, the signal processing unit may determine, based on the digital signal, a plurality of photodetectors corresponding to the same digital signal, and further determine a plurality of fluorescent units connected to the plurality of photodetectors as a plurality of fluorescent units corresponding to the same incident optical signal.

Figure 20:
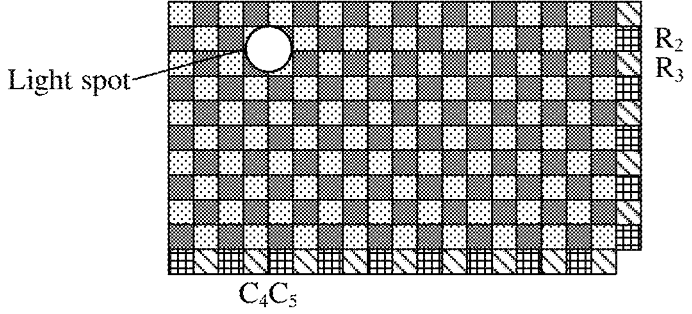
FIG. 20 is a schematic diagram of a structure of a signal processing method according to an embodiment of this application.

For example, as shown in FIG. 20, a light spot converged by the incident optical signal is the light spot shown in FIG. 20. Four fluorescent units corresponding to the light spot may generate four emergent optical signals based on a fluorescent effect, and separately transmit the four emergent optical signals to photodetectors $C_4$, $C_5$, $R_2$, and $R_3$. After separately receiving the four emergent optical signals, the photodetectors $C_4$, $C_5$, $R_2$, and $R_3$ may convert the four emergent optical signals into four electrical signals, and transmit the four electrical signals to the signal processing unit. The signal processing unit converts the four electrical signals into four digital signals. Because the four electrical signals correspond to the same incident optical signal, the four digital signals are the same. Therefore, the signal processing unit may determine the photodetectors $C_4$, $C_5$, $R_2$, and $R_3$ as photodetectors corresponding to the same incident optical signal. In this way, four fluorescent units corresponding to the same incident optical signal are determined based on the fluorescent units connected to the four photodetectors.

According to the foregoing descriptions, the signal processing unit in the optical receiver may further determine, based on the digital signal, whether one incident optical signal corresponds to a plurality of fluorescent units. When the incident optical signal corresponds to a plurality of same digital signals, it may be determined that the incident optical signal corresponds to a plurality of fluorescent units. When the incident optical signal corresponds to one digital signal, it may be determined that the incident optical signal corresponds to one fluorescent unit.

Step 1705: The signal processing unit in the optical receiver determines, based on a digital signal corresponding to each fluorescent unit, whether there is a multi-user conflict in each fluorescent unit.

The multi-user conflict is that a plurality of incident optical signals correspond to one digital signal.

For example, the signal processing unit in the optical receiver may determine, based on one or more of the following parameters of the digital signal corresponding to each fluorescent unit: a waveform, a signal-to-noise ratio, and a signal to interference plus noise ratio, whether there is a multi-user conflict in the fluorescent unit corresponding to the digital signal.

For example, when a waveform of the digital signal suddenly changes, it may be determined that there is the multi-user conflict in the fluorescent unit corresponding to the digital signal; when the signal-to-noise ratio of the digital signal significantly decreases, it may be determined that there is the multi-user conflict in the fluorescent unit corresponding to the digital signal; or when the signal to interference plus noise ratio of the digital signal significantly decreases, it may be determined that there is the multi-user conflict in the fluorescent unit corresponding to the digital signal.

Figure 21:
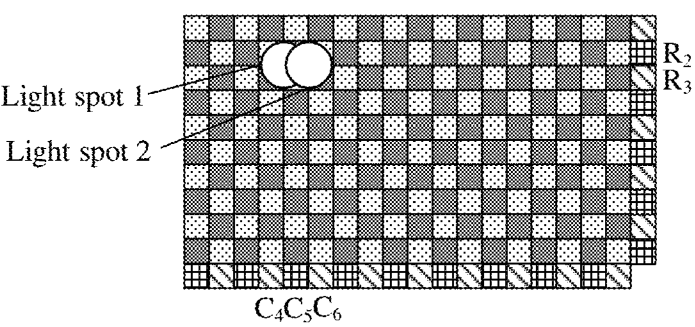
FIG. 21 is a schematic diagram of a structure of a signal processing method according to an embodiment of this application.

For example, as shown in FIG. 21, a light spot 1 converged by an incident light signal 1 is a light spot 1 shown in FIG. 21, and a light spot 2 converged by an incident light signal 2 is a light spot 2 shown in FIG. 21. Four fluorescent units corresponding to the light spot 1 may generate four emergent optical signals based on a fluorescent effect, and separately transmit the four emergent optical signals to the photodetectors $C_4$, $C_5$, $R_2$, and $R_3$. Four fluorescent units corresponding to the light spot 2 may generate four emergent optical signals based on a fluorescent effect, and separately transmit the four emergent optical signals to the photodetectors $C_5$, $C_6$, $R_2$, and $R_3$. Because $C_5$, $R_2$, and $R_3$ simultaneously receive the emergent optical signal corresponding to the incident optical signal 1 and the emergent optical signal corresponding to the incident optical signal 2, $C_5$, $R_2$, and $R_3$ may convert the emergent optical signal corresponding to the incident optical signal 1 and the emergent optical signal corresponding to the incident optical signal 2 into one electrical signal, and the signal processing unit converts the electrical signal into a digital signal. Because the electrical signal is converted based on the emergent optical signal corresponding to the incident optical signal 1 and the emergent optical signal corresponding to the incident optical signal 2, a signal-to-noise ratio or a signal to interference plus noise ratio of the digital signal converted from the electrical signal is significantly reduced, or a waveform of the digital signal suddenly changes. Therefore, it may be determined that there is a multi-user conflict in the fluorescent units corresponding to $C_5$, $R_2$, and $R_3$. Because $C_4$ and $C_6$ receive only an emergent optical signal corresponding to one incident optical signal, $C_4$ and $C_6$ may convert the emergent optical signal corresponding to the received incident optical signal into an electrical signal, and the signal processing unit converts the electrical signal into a digital signal. Because the electrical signal is converted based on the emergent optical signal corresponding to the incident optical signal, a signal-to-noise ratio or a signal to interference plus noise ratio of the digital signal converted from the electrical signal does not significantly decrease, or a waveform of the digital signal does not suddenly change. Therefore, it may be determined that there is no multi-user conflict in $C_4$ and $C_6$. A fluorescent unit connected to $C_4$ may be determined as a fluorescent unit corresponding to the incident light signal 1, and a fluorescent unit connected to $C_6$ may be determined as a fluorescent unit corresponding to the incident light signal 2.

Further, because the photodetectors $C_5$, $R_2$, and $R_3$ also receive the emergent optical signal and there is a multi-user conflict, it may indicate that the three fluorescent units connected to the photodetectors $C_5$, $R_2$, and $R_3$ all receive a plurality of incident optical signals (that is, it indicates that the three fluorescent units connected to the photodetectors $C_5$, $R_2$, and $R_3$ all receive the incident optical signal 1 and the incident optical signal 2). Therefore, the three fluorescent units connected to the photodetectors $C_5$, $R_2$, and $R_3$ may also be determined as the fluorescent units corresponding to the incident light signal 1, and the three fluorescent units connected to the photodetectors $C_5$, $R_2$, and $R_3$ may be determined as the fluorescent units corresponding to the incident light signal 2.

Further, when there is the multi-user conflict, the position of the light spot on the fluorescent antenna may be further adjusted based on step 1706, to avoid the multi-user conflict.

Step 1706: When there is the multi-user conflict, an adjustment unit in the optical receiver adjusts a position of the light spot on the fluorescent antenna, to avoid the multi-user conflict.

The transceiver unit in the optical receiver may send the processing result of the digital signal processed by the signal processing unit to the adjustment unit, so that the adjustment unit adjusts the position of the light spot on the fluorescent antenna based on the processing result, to narrow an overlapping region between a plurality of light spots, and avoid a multi-user conflict.

For example, as shown in FIG. 21, the signal processing unit may use the processing result in which there is the multi-user conflict in $C_5$, $R_2$, and $R_3$, and send the processing result to the adjustment unit by using the transceiver unit, so that the adjustment unit adjusts positions of light spots corresponding to $C_5$, $R_2$, and $R_3$, to reduce an overlapping region between a plurality of light spots, and avoid the multi-user conflict.

Corresponding to the foregoing steps 1704 to 1706, when the incident light signal corresponds to a plurality of fluorescent units, the optical receiver may further determine, based on the plurality of fluorescent units corresponding to the incident optical signal in the following step 1707, one or more fluorescent regions corresponding to the incident light signal, and further, may further determine, based on the following step 1708, whether there is a multi-user conflict in each fluorescent region.

Step 1707: The optical receiver converts, by using the signal processing unit, the electrical signal into a digital signal, and determines, based on the digital signal, one or more fluorescent regions corresponding to the incident optical signal.

The signal processing unit in the optical receiver may determine fluorescent units corresponding to the same digital signal as fluorescent units corresponding to the same incident optical signal, and determine a fluorescent region of an overlapping part of the fluorescent units corresponding to the same incident optical signal as a fluorescent region corresponding to the incident optical signal.

For example, as shown in FIG. 20, a light spot converged by the incident optical signal is the light spot shown in FIG. 20. Four fluorescent units corresponding to the light spot may generate four emergent optical signals based on a fluorescent effect, and separately transmit the four emergent optical signals to the photodetectors $C_4$, $C_5$, $R_2$, and $R_3$. After separately receiving the four emergent optical signals, the photodetectors $C_4$, $C_5$, $R_2$, and $R_3$ may convert the four emergent optical signals into four electrical signals, and transmit the four electrical signals to the signal processing unit. The signal processing unit converts the four electrical signals into four digital signals. Because the four emergent optical signals correspond to the same incident optical signal, the four digital signals are the same. Therefore, the signal processing unit may determine the photodetectors $C_4$, $C_5$, $R_2$, and $R_3$ as photodetectors corresponding to the same incident optical signal. In addition, four fluorescent units connected to the four photodetectors are determined as four fluorescent units corresponding to the incident optical signal, and a fluorescent region of an overlapping part of the four fluorescent units is determined as the fluorescent region corresponding to the incident optical signal.

Step 1708: The signal processing unit in the optical receiver determines, based on a digital signal corresponding to each fluorescent region, whether there is a multi-user conflict in each fluorescent region.

The signal processing unit in the optical receiver may determine, based on one or more of the following parameters of the digital signal corresponding to each fluorescent region: a waveform, a signal-to-noise ratio, and a signal to interference plus noise ratio, whether there is a multi-user conflict in the fluorescent region corresponding to the digital signal.

For example, when a waveform of the digital signal suddenly changes, it may be determined that there is the multi-user conflict in the fluorescent region corresponding to the digital signal; when the signal-to-noise ratio of the digital signal significantly decreases, it may be determined that there is the multi-user conflict in the fluorescent region corresponding to the digital signal; or when the signal to interference plus noise ratio of the digital signal significantly decreases, it may be determined that there is the multi-user conflict in the fluorescent region corresponding to the digital signal.

For example, as shown in FIG. 21, a light spot 1 converged by an incident light signal 1 is a light spot 1 shown in FIG. 21, and a light spot 2 converged by an incident light signal 2 is a light spot 2 shown in FIG. 21. Four fluorescent units corresponding to the light spot 1 may generate four emergent optical signals based on a fluorescent effect, and separately transmit the four emergent optical signals to the photodetectors $C_4$, $C_5$, $R_2$, and $R_3$. Four fluorescent units corresponding to the light spot 2 may generate four emergent optical signals based on a fluorescent effect, and separately transmit the four emergent optical signals to the photodetectors $C_5$, $C_6$, $R_2$, and $R_3$. Because $C_5$, $R_2$, and $R_3$ simultaneously receive the emergent optical signal corresponding to the incident optical signal 1 and the emergent optical signal corresponding to the incident optical signal 2, $C_5$, $R_2$, and $R_3$ may convert the emergent optical signal corresponding to the incident optical signal 1 and the emergent optical signal corresponding to the incident optical signal 2 into one electrical signal, and the signal processing unit converts the electrical signal into a digital signal. Because the electrical signal is converted based on the emergent optical signal corresponding to the incident optical signal 1 and the emergent optical signal corresponding to the incident optical signal 2, a signal-to-noise ratio or a signal to interference plus noise ratio of the digital signal converted from the electrical signal is significantly reduced, or a waveform of the digital signal suddenly changes. Therefore, it may be determined that there is a multi-user conflict in $C_5$, $R_2$, and $R_3$. Because $C_4$ and $C_6$ receive only an emergent optical signal corresponding to one incident optical signal, $C_4$ and $C_6$ may convert the emergent optical signal corresponding to the received incident optical signal into an electrical signal, and the signal processing unit converts the electrical signal into a digital signal. Because the electrical signal is converted based on the emergent optical signal corresponding to the incident optical signal, a signal-to-noise ratio or a signal to interference plus noise ratio of the digital signal converted from the electrical signal does not significantly decrease, or a waveform of the digital signal does not suddenly change. Therefore, it may be determined that there is no multi-user between $C_4$ and $C_6$. A fluorescent unit connected to $C_4$ may be determined as a fluorescent unit corresponding to the incident light signal 1, and a fluorescent unit connected to $C_6$ may be determined as a fluorescent unit corresponding to the incident light signal 2. Because the photodetectors $C_5$, $R_2$, and $R_3$ also receive the emergent optical signal and there is a multi-user conflict, it may indicate that all three fluorescent units connected to the photodetectors $C_5$, $R_2$, and $R_3$ receive a plurality of incident optical signals (that is, it indicates that all three fluorescent units connected to the photodetectors $C_5$, $R_2$, and $R_3$ receive the incident optical signal 1 and the incident optical signal 2). Therefore, four fluorescent units connected to the photodetectors $C_4$, $C_5$, $R_2$, and $R_3$ may be determined as fluorescent units corresponding to the incident light signal 1, and a fluorescent region of an overlapping part of the four fluorescent units is determined as the fluorescent region corresponding to the incident light signal 1. In the four fluorescent regions, there is no multi-user conflict in the fluorescent region of the photodetector $C_4$, and there is a multi-user conflict in the fluorescent regions of the photodetectors $C_5$, $R_2$, and $R_3$. Four fluorescent units connected to the photodetectors $C_5$, $C_6$, $R_2$, and R 3 are determined as fluorescent units corresponding to the incident light signal 2, and a fluorescent region of an overlapping part of the four fluorescent units is determined as a fluorescent region corresponding to the incident light signal 2. In the four fluorescent regions, there is no multi-user conflict in the fluorescent region of the photodetector $C_6$, and there is a multi-user conflict in the fluorescent regions of the photodetectors $C_5$, $R_2$, and $R_3$.

Further, when there is the multi-user conflict, the position of the light spot on the fluorescent antenna may be further adjusted based on step 1709, to avoid the multi-user conflict.

Step 1709: When there is the multi-user conflict, an adjustment unit in the optical receiver adjusts a position of the light spot on the fluorescent antenna, to avoid the multi-user conflict.

The transceiver unit in the optical receiver may send the processing result of the digital signal processed by the signal processing unit to the adjustment unit, so that the adjustment unit adjusts the position of the light spot on the fluorescent antenna based on the processing result, to narrow an overlapping region between a plurality of light spots, and avoid a multi-user conflict.

For example, as shown in FIG. 21, the signal processing unit may use the processing result in which there is the multi-user conflict in $C_5$, $R_2$, and $R_3$, and send the processing result to the adjustment unit by using the transceiver unit, so that the adjustment unit adjusts positions of light spots corresponding to $C_5$, $R_2$, and $R_3$, to reduce an overlapping region between a plurality of light spots, and avoid the multi-user conflict.

Execution of step 1707 to step 1709 is not necessarily related to execution of step 1704 to step 1706. Only step 1704 to step 1706 may be performed, or only step 1707 to step 1709 may be performed, or step 1704 to step 1706 and step 1707 to step 1709 may be performed. In addition, there is no limitation on a sequence between execution of step 1704 to step 1706 and execution of step 1707 and step 1709.

In addition, in the specification, claims, and accompanying drawings of this application, the terms "first", "second", and the like are intended to distinguish between different objects but do not indicate a particular order. In addition, the terms "include" and "have" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, a plurality of layers may be two or more layers, and a plurality of pieces may be two or more pieces. One or more layers may be described as at least one layer, and one or more may be described as at least one. The at least two layers (pieces) refer to two layers (pieces) or three layers (pieces) and more layers (pieces). The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

What is claimed is:

1. A fluorescent antenna, comprising:

one or more layers of fluorescent arrays, wherein the fluorescent arrays comprise:

a plurality of fluorescent units; and an isolation layer between adjacent fluorescent units, wherein the fluorescent units of the plurality of fluorescent units comprise one or more fluorescent regions, the isolation layer is used to isolate emergent optical signals converted by the adjacent fluorescent units, and the fluorescent antenna comprises one layer of fluorescent array, and the fluorescent units are all fluorescent regions, or the fluorescent antenna comprises at least two layers of fluorescent arrays, the fluorescent units of the plurality of fluorescent units further comprise one or more transparent regions in two adjacent layers of fluorescent arrays, and the transparent region of a first layer of fluorescent array overlaps the fluorescent region of a second layer of fluorescent array such that an incident light signal arrives at the fluorescent region of the second layer of the fluorescent array through the transparent region of the first layer of the fluorescent array.

2. The fluorescent antenna according to claim 1, wherein the isolation layer comprises one or more of a high reflection layer, a first filter layer, or a dielectric layer, and a refractive index of the dielectric layer is less than a refractive index of a corresponding fluorescent unit of the plurality of fluorescent units.

3. The fluorescent antenna according to claim 1, wherein the transparent region and the fluorescent region are alternately arranged within a corresponding fluorescent unit of the plurality of fluorescent units.

4. The fluorescent antenna according to claim 2, wherein the fluorescent antenna comprises the at least two layers of fluorescent arrays, a second filter layer is between two adjacent layers of fluorescent arrays, and the second filter layer is used to isolate the emergent optical signals between the two adjacent layers of fluorescent arrays.

5. The fluorescent antenna according to claim 1, wherein an entire region of each fluorescent region of the fluorescent units of the plurality of fluorescent units is filled with a fluorescent material, and all fluorescent regions of the fluorescent units of the plurality of fluorescent units are filled with the same fluorescent material, and each fluorescent unit is connected to one photodetector, or at least two fluorescent regions of the fluorescent units of the plurality of fluorescent units are filled with different fluorescent materials, and each fluorescent unit is connected to at least two photodetectors.

6. The fluorescent antenna according to claim 1, wherein a partial region of each fluorescent region of the fluorescent units of the plurality of fluorescent units is filled with a fluorescent material, different fluorescent regions are filled with different fluorescent materials, and each fluorescent unit is connected to a plurality of photodetectors.

7. The fluorescent antenna according to claim 1, wherein each fluorescent region of the fluorescent units of the plurality of fluorescent units is filled with one or more fluorescent materials.

8. The fluorescent antenna according to claim 1, wherein the fluorescent units of the plurality of fluorescent units comprise at least two fluorescent materials, a wavelength of an emergent optical signal converted by a first fluorescent region is greater than a wavelength of an emergent optical signal converted by a second fluorescent region, a fluorescent material filled in the first fluorescent region is different from a fluorescent material filled in the second fluorescent region, a distance between the first fluorescent region and a photodetector is greater than a distance between the second fluorescent region and the photodetector, and the photodetector is connected to the fluorescent units.

9. The fluorescent antenna according to claim 8, wherein the wavelength of the emergent optical signal converted by the first fluorescent region in a corresponding fluorescent unit of the plurality of fluorescent units is greater than an absorption spectrum of the fluorescent material filled in the second fluorescent region of the corresponding fluorescent unit.

10. The fluorescent antenna according to claim 8, wherein the fluorescent units of the plurality of fluorescent units comprise at least two fluorescent materials, and the fluorescent units of the plurality of fluorescent units correspond to emergent optical signals of at least two wavelengths.

11. An optical receiver, comprising:

a lens;

a fluorescent antenna; and a photodetector array, wherein the lens is configured to receive an incident optical signal, such that the incident optical signal passes through the lens and is converged on the fluorescent antenna to form a light spot, the fluorescent antenna comprises:

one or more layers of fluorescent arrays, wherein the fluorescent arrays comprise:

a plurality of fluorescent units; and an isolation layer between adjacent fluorescent units, the photodetector array comprises a plurality of photodetectors, and each fluorescent unit of the plurality of fluorescent units is connected to one or more photodetectors of the plurality of photodetectors, the fluorescent units of the plurality of fluorescent units comprise one or more fluorescent regions, the isolation layer is used to isolate emergent optical signals converted by the adjacent fluorescent units, and when the fluorescent antenna comprises one layer of fluorescent array, and the fluorescent units are all fluorescent regions, or the fluorescent antenna comprises at least two layers of fluorescent arrays, the fluorescent units of the plurality of fluorescent units further comprise one or more transparent regions in two adjacent layers of fluorescent arrays, and the transparent region of a first layer of fluorescent array overlaps the fluorescent region of a second layer of fluorescent array such that an incident light signal arrives at the fluorescent region of the second layer of the fluorescent array through the transparent region of the first layer of the fluorescent array.

12. The optical receiver according to claim 11, wherein the isolation layer comprises one or more of a high reflection layer, a first filter layer, or a dielectric layer, and a refractive index of the dielectric layer is less than a refractive index of a corresponding fluorescent unit of the plurality of fluorescent units.

13. The optical receiver according to claim 11, wherein the transparent region and the fluorescent region are alternately arranged within a corresponding fluorescent unit of the plurality of fluorescent units.

14. The optical receiver according to claim 12, wherein the fluorescent antenna comprises the at least two layers of fluorescent arrays, a second filter layer is between two adjacent layers of fluorescent arrays, and the second filter layer is used to isolate the emergent optical signals between the two adjacent layers of fluorescent arrays.

15. The optical receiver according to claim 11, wherein an entire region of each fluorescent region of the fluorescent units of the plurality of fluorescent units is filled with a fluorescent material, and all fluorescent regions of the fluorescent units of the plurality of fluorescent units are filled with the same fluorescent material, and each fluorescent unit is connected to one photodetector of the plurality of photodetectors, or at least two fluorescent regions of the fluorescent units of the plurality of fluorescent units are filled with different fluorescent materials, and each fluorescent unit is connected to at least two photodetectors of the plurality of photodetectors.

16. The optical receiver according to claim 11, wherein a partial region of each fluorescent region of the fluorescent units of the plurality of fluorescent units is filled with a fluorescent material, and different fluorescent regions are filled with different fluorescent material.

17. The optical receiver according to claim 11, wherein each fluorescent region of the fluorescent units of the plurality of fluorescent units is filled with one or more fluorescent materials.

18. The optical receiver according to claim 11, wherein the fluorescent units of the plurality of fluorescent units comprise at least two fluorescent materials, a wavelength of an emergent optical signal converted by a first fluorescent region is greater than a wavelength of an emergent optical signal converted by a second fluorescent region, a fluorescent material filled in the first fluorescent region is different from a fluorescent material filled in the second fluorescent region, a distance between the first fluorescent region and a photodetector of the plurality of photodetectors is greater than a distance between the second fluorescent region and the photodetector of the plurality of photodetectors.

19. The optical receiver according to claim 18, wherein the wavelength of the emergent optical signal converted by the first fluorescent region in a corresponding fluorescent unit of the plurality of fluorescent units is greater than an absorption spectrum of the fluorescent material filled in the second fluorescent region of the corresponding fluorescent unit.

20. The optical receiver according to claim 17, wherein the fluorescent units of the plurality of fluorescent units comprise at least two fluorescent materials, and the fluorescent units of the plurality of fluorescent units correspond to emergent optical signals of at least two wavelengths.

* * * * *